(12) United States Patent
Zhang

(10) Patent No.: US 10,139,570 B2
(45) Date of Patent: *Nov. 27, 2018

(54) ADAPTER FOR FIBER OPTIC MODULE

(71) Applicant: CommScope Technologies LLC, Hickory, NC (US)

(72) Inventor: Yuanzhe Zhang, Shanghai (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,554

(22) Filed: Aug. 15, 2016

(65) Prior Publication Data
US 2017/0131481 A1 May 11, 2017

Related U.S. Application Data

(63) Continuation of application No. 14/343,291, filed as application No. PCT/CN2011/079371 on Sep. 6, 2011, now Pat. No. 9,417,401.

(51) Int. Cl.
G02B 6/44 (2006.01)
G02B 6/38 (2006.01)
G02B 6/46 (2006.01)

(52) U.S. Cl.
CPC ......... G02B 6/3825 (2013.01); G02B 6/3893 (2013.01); G02B 6/3897 (2013.01);
(Continued)

(58) Field of Classification Search
None
See application file for complete search history.

(56) References Cited

U.S. PATENT DOCUMENTS 4,435,612 A 3/1984 Smith
4,650,933 A 3/1987 Benda et al.
(Continued)

FOREIGN PATENT DOCUMENTS

CN 1656405 A 8/2005
CN 101384938 A 3/2009
(Continued)

OTHER PUBLICATIONS

International Search Report for International Patent Application No. PCT/CN2011/079371 dated Jun. 14, 2012 (3 pages).
(Continued)

Primary Examiner — Tina Wong
(74) Attorney, Agent, or Firm — Merchant & Gould P.C.

(57) ABSTRACT

An adapter structure for use with a telecommunications module that is configured to be slidably inserted into a first type of telecommunications chassis comprises a body configured to be mounted to the telecommunications module. The body of the adapter structure is configured for mounting the telecommunications module to a second type of telecommunications chassis that is different than the first type of telecommunications chassis, wherein the telecommunications module is not configured to be mounted to the second type of telecommunications chassis without the adapter structure. The adapter structure includes at least one fiber optic connector protruding outwardly from the body for receiving a fiber optic signal to be relayed to fiber optic equipment of the telecommunications module.

16 Claims, 21 Drawing Sheets

(52) U.S. Cl.
CPC ......... *G02B 6/4457* (2013.01); *G02B 6/4471* (2013.01); *G02B 6/46* (2013.01); G02B 6/3849 (2013.01); G02B 6/4453 (2013.01); Y10T 29/49947 (2015.01)

(56) References Cited

U.S. PATENT DOCUMENTS

| | | |
|---|---|---|
| 4,768,961 A | 9/1988 | Lau |
| 4,770,639 A | 9/1988 | Lau |
| 4,797,114 A | 1/1989 | Lau |
| 4,820,200 A | 4/1989 | Lau |
| 4,824,196 A | 4/1989 | Bylander |
| 4,840,568 A | 6/1989 | Burroughs et al. |
| 4,850,901 A | 7/1989 | Smith et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,285,515 A | 2/1994 | Milanowski et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,647,045 A | 7/1997 | Robinson et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,116,961 A | 9/2000 | Henneberger et al. |
| 6,195,493 B1 | 2/2001 | Bridges |
| 6,208,796 B1 | 3/2001 | Williams Vigliaturo |
| 6,226,111 B1 | 5/2001 | Chang et al. |
| 6,226,434 B1 | 5/2001 | Koshiyama et al. |
| 6,263,136 B1 | 7/2001 | Jennings et al. |
| 6,307,998 B2 | 10/2001 | Williams Vigliaturo |
| 6,328,608 B1 | 12/2001 | Olson et al. |
| 6,363,183 B1 | 3/2002 | Koh |
| 6,370,294 B1 | 4/2002 | Pfeiffer et al. |
| 6,385,381 B1 | 5/2002 | Janus et al. |
| 6,418,262 B1 | 7/2002 | Puetz et al. |
| 6,424,781 B1 | 7/2002 | Puetz et al. |
| 6,424,783 B1 | 7/2002 | Hara |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,711,339 B2 | 3/2004 | Puetz et al. |
| 6,719,382 B2 | 4/2004 | Sucharczuk et al. |
| 6,760,531 B1 | 7/2004 | Solheid et al. |
| 6,761,594 B2 | 7/2004 | Johnsen et al. |
| 6,768,860 B2 | 7/2004 | Libery |
| 6,810,193 B1 | 10/2004 | Müller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,110,527 B2 | 9/2006 | Skraddle et al. |
| 7,118,284 B2 | 10/2006 | Nakajima et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,303,220 B2 | 12/2007 | Zellak |
| 7,310,474 B2 | 12/2007 | Kanasaki et al. |
| 7,333,606 B1 | 2/2008 | Swam et al. |
| 7,346,254 B2 | 3/2008 | Kramer et al. |
| 7,362,941 B2 | 4/2008 | Rinderer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,416,349 B2 | 8/2008 | Kramer |
| 7,418,181 B2 | 8/2008 | Zimmel et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,542,649 B1 | 6/2009 | Andersen |
| 7,590,328 B2 | 9/2009 | Reinhardt et al. |
| 7,606,459 B2 | 10/2009 | Zimmel et al. |
| 7,636,507 B2 | 12/2009 | Lu et al. |
| 7,764,858 B2 | 7/2010 | Bayazit et al. |
| 7,835,611 B2 | 11/2010 | Zimmel |
| 7,853,112 B2 | 12/2010 | Zimmel et al. |
| 7,885,505 B2 | 2/2011 | Zimmel |
| 7,889,961 B2 | 2/2011 | Cote et al. |
| 7,912,336 B2 | 3/2011 | Zimmel |
| 8,009,954 B2 | 8/2011 | Bran de Leon et al. |
| 8,325,494 B2 | 12/2012 | Kimbrell et al. |
| 8,346,045 B2 | 1/2013 | Zimmel et al. |
| 9,417,401 B2 * | 8/2016 | Zhang .................. G02B 6/3897 |
| 2002/0041738 A1 | 4/2002 | Carberry et al. |
| 2002/0181896 A1 | 12/2002 | McClellan et al. |
| 2003/0031423 A1 | 2/2003 | Zimmel |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2004/0062508 A1 | 4/2004 | Blankenship et al. |
| 2004/0109660 A1 | 6/2004 | Liberty |
| 2004/0240826 A1 | 12/2004 | Daoud et al. |
| 2005/0002633 A1 | 1/2005 | Solheid et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0100301 A1 | 5/2005 | Solheid et al. |
| 2005/0105873 A1 | 5/2005 | Reagan et al. |
| 2005/0105879 A1 | 5/2005 | Kanasaki et al. |
| 2005/0141815 A1 | 6/2005 | Pan et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0269206 A1 | 11/2006 | Zimmel |
| 2006/0285807 A1 | 12/2006 | Lu et al. |
| 2007/0025675 A1 | 2/2007 | Kramer |
| 2007/0036503 A1 | 2/2007 | Solheid et al. |
| 2007/0047893 A1 | 3/2007 | Kramer et al. |
| 2007/0147765 A1 | 6/2007 | Gniadek et al. |
| 2007/0189692 A1 | 8/2007 | Zimmel et al. |
| 2007/0230111 A1 | 10/2007 | Starr et al. |
| 2009/0022468 A1 | 1/2009 | Zimmel |
| 2009/0103878 A1 | 4/2009 | Zimmel |
| 2009/0116806 A1 | 5/2009 | Zimmel et al. |

(56) References Cited

U.S. PATENT DOCUMENTS

| | | | |
|---|---|---|---|
| 2010/0129030 A1 | 5/2010 | Giraud et al. | |
| 2010/0158464 A1 | 6/2010 | Zimmel et al. | |
| 2011/0019964 A1 | 1/2011 | Nhep et al. | |
| 2012/0301096 A1 | 11/2012 | Badar et al. | |
| 2013/0129299 A1 | 5/2013 | Zimmel | |

FOREIGN PATENT DOCUMENTS

| | | |
|---|---|---|
| CN | 101836147 A | 9/2010 |
| CN | 101677412 B | 2/2013 |
| DE | 41 30 706 A1 | 3/1993 |
| DE | 202 01 170 U1 | 5/2002 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| GB | 2 300 978 A | 11/1996 |
| WO | WO 96/36896 | 11/1996 |
| WO | WO 00/75706 A2 | 12/2000 |
| WO | WO 02/099528 A1 | 12/2002 |
| WO | WO 02/103429 A2 | 12/2002 |
| WO | WO 03/093889 A1 | 11/2003 |
| WO | WO 2006/127397 A1 | 11/2006 |

OTHER PUBLICATIONS

ADC Telecommunications, Inc., DS3 Digital Signal Cross-Connect (DSX3) System Application Guide, Document No. ADCP-80-323, 1st Edition, Issue 2, Dec. 1996, p. 1-10; p. 1-11.

ADC Telecommunications, Inc., DSX-1 Digital Signal Cross Connect PIX-DSX-1—Fifth Edition, Oct. 1994, 36 Pages.

ADC Telecommunications, Inc., DSX-3 Digital Signal Cross-Connect, Front and Rear Cross-Connect Products, Doc. No. 274, Oct. 2004, 65 pages.

ADC Telecommunications, Inc., OmniReach FTTP Solutions, Doc. No. 1276550, dated May 2004, 12 pp.

ADC Telecommunications, Inc., PxPlus™ DS1 Digital Signal Cross-Connect, dated Jan. 1997, 12 Pages.

Pending U.S. Appl. No. 11/138,063, filed May 25, 2005, entitled "Fiber Optic Splitter Module".

Pending U.S. Appl. No. 11/138,889, filed May 25, 2005, entitled "Fiber Optic Adapter Module".

Pending U.S. Appl. No. 11/354,297, Zimmel et al, filed Feb. 13, 2006.

European Search Report for Application No. 10850476.2 dated Oct. 14, 2013.

International Search Report and Written Opinion for International Application No. PCT/US2010/021129 dated Jul. 6, 2010.

International Search report for International Application No. PCT/CN2010/072247 dated Oct. 21, 2012.

OmniReach™ FONS Fiber Distribution Hub Plug and Play Splitter Retrofit Bracket Kit, Installation Instructions, ADCP-96-129, Issue 2, 2 pages (Nov. 2007).

Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007).

Prosecution History of U.S. Appl. No. 11/138,063 (OA Dec. 27, 2006; Resp. Apr. 27, 2007; OA Jul. 30, 2007).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance dated Aug. 2, 2007).

* cited by examiner

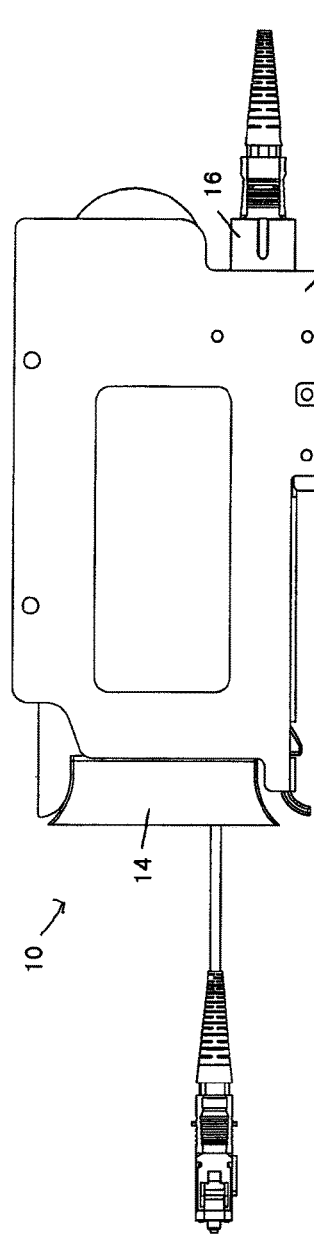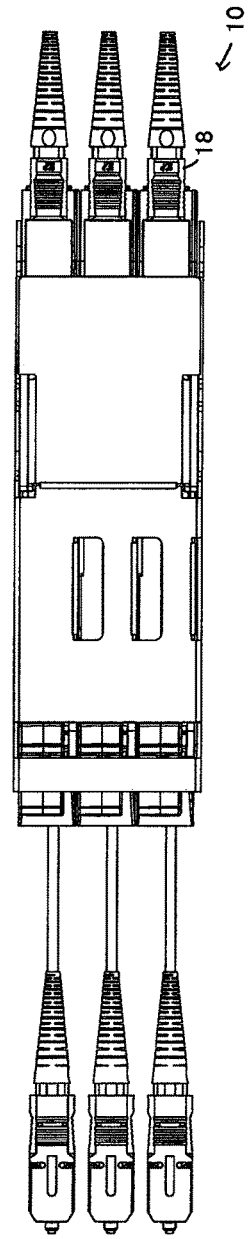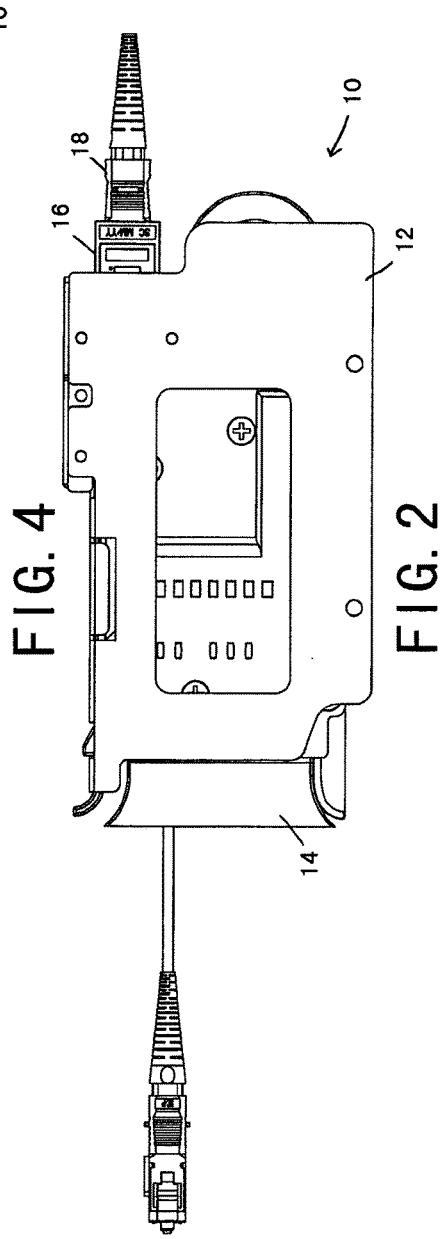

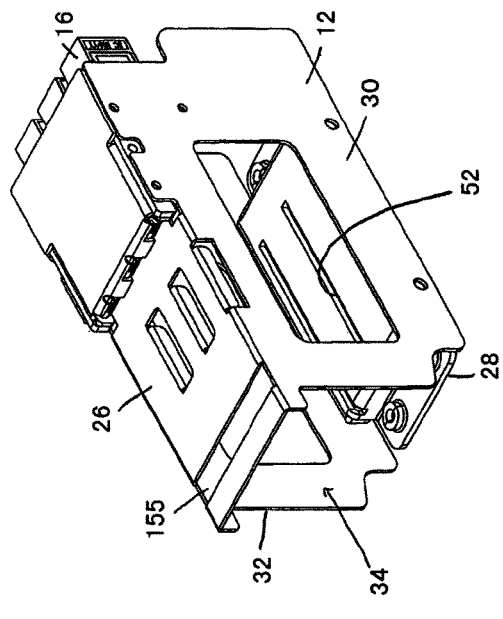
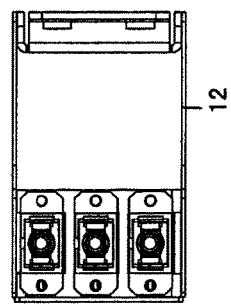
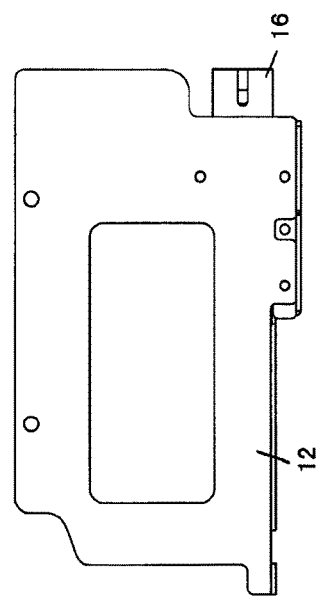
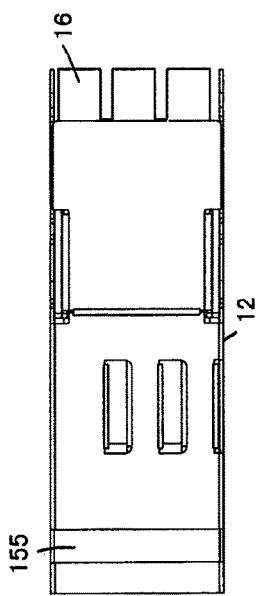
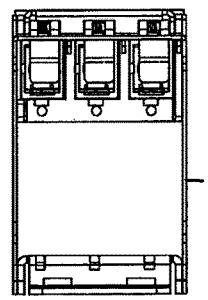

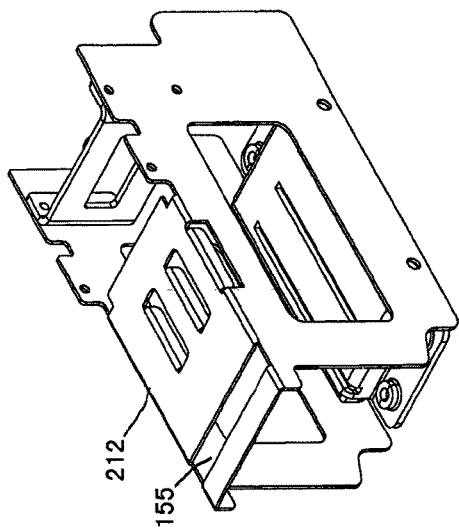
FIG. 13
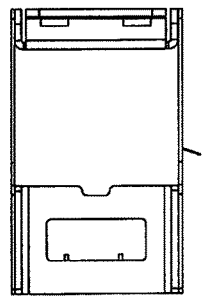
FIG. 18
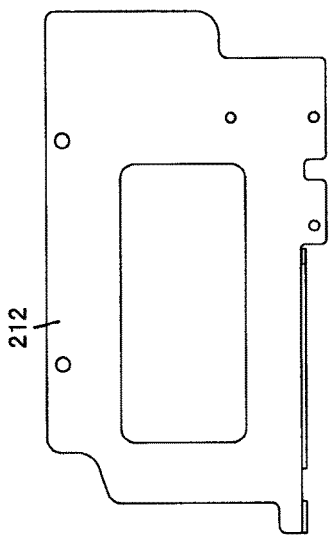
FIG. 16
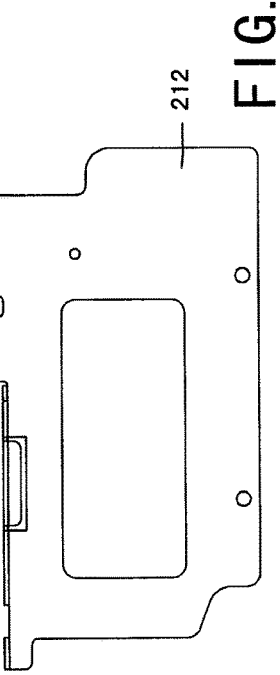
FIG. 14
FIG. 15
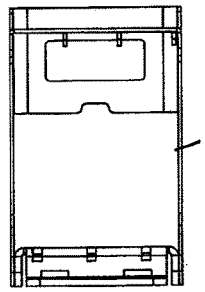
FIG. 17

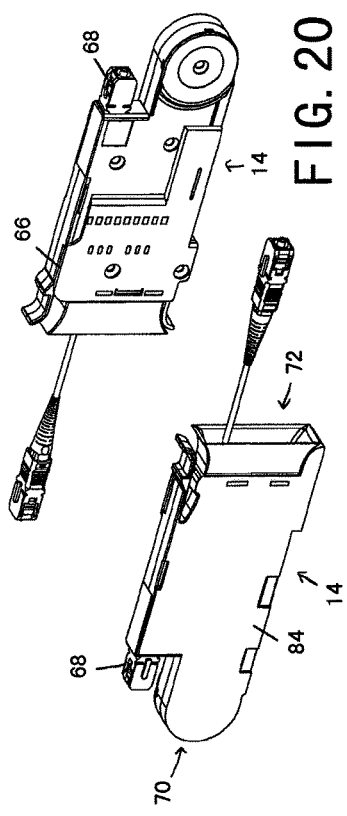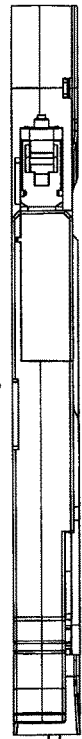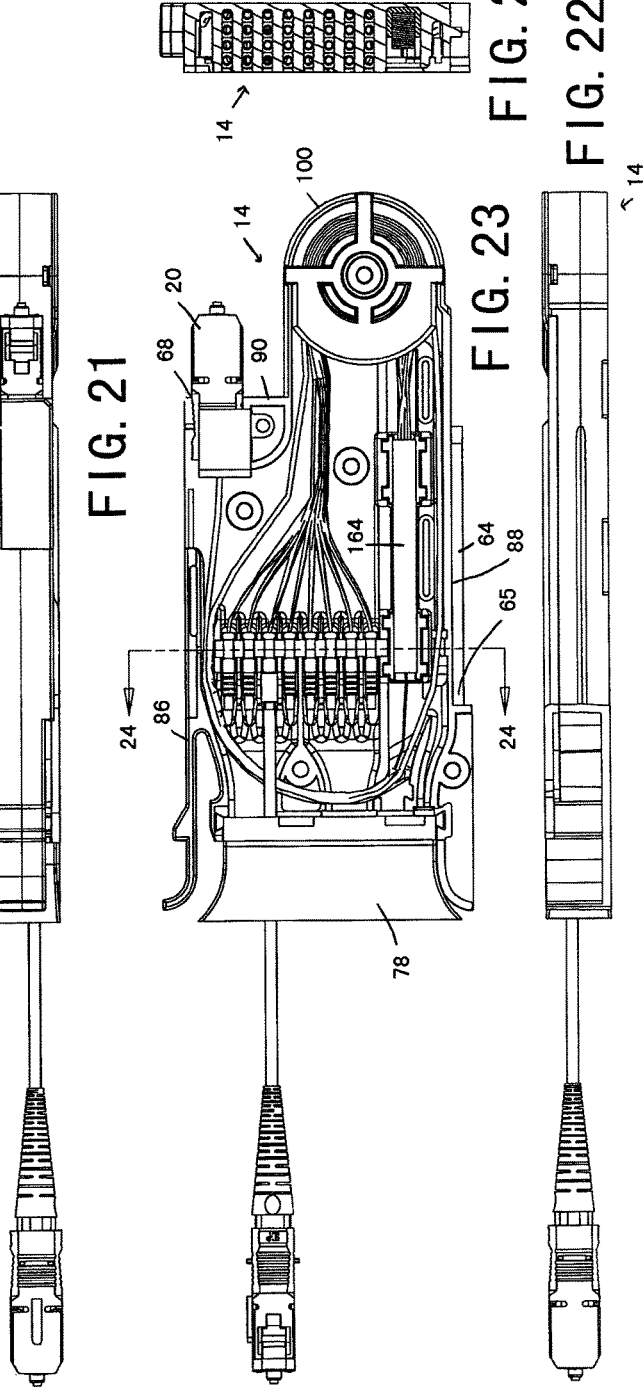

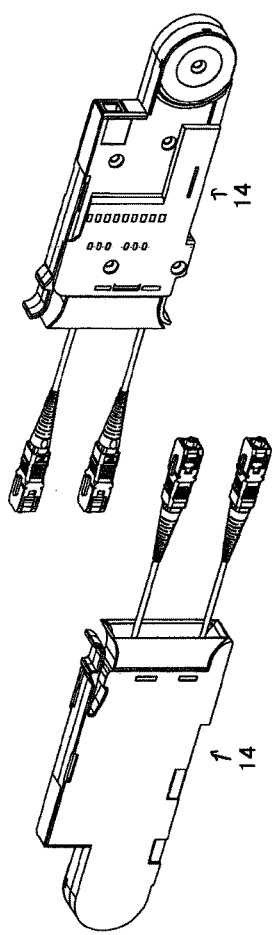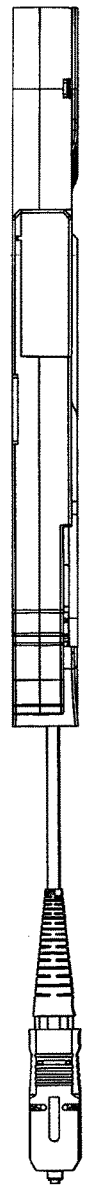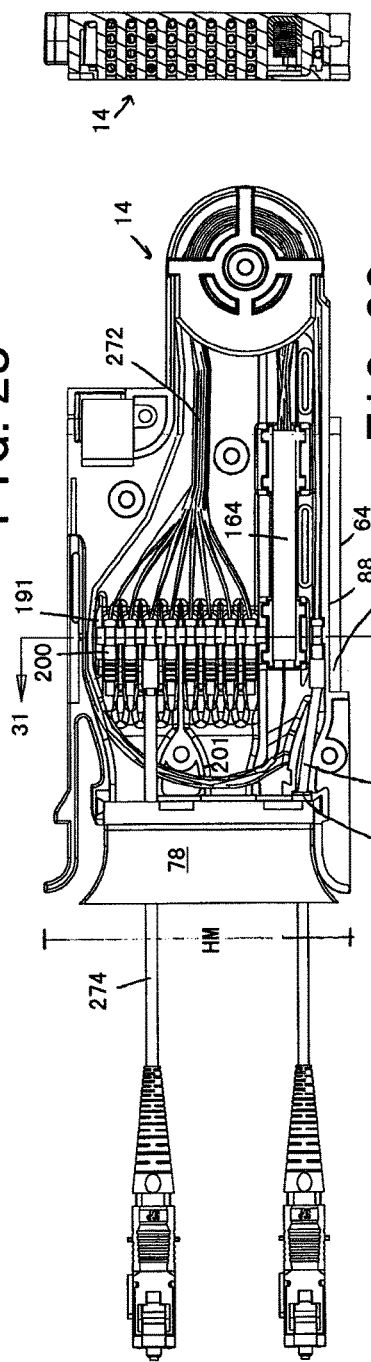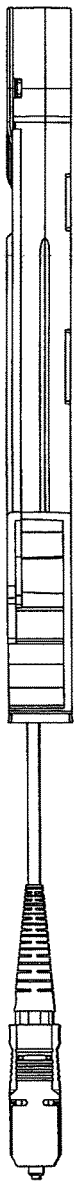

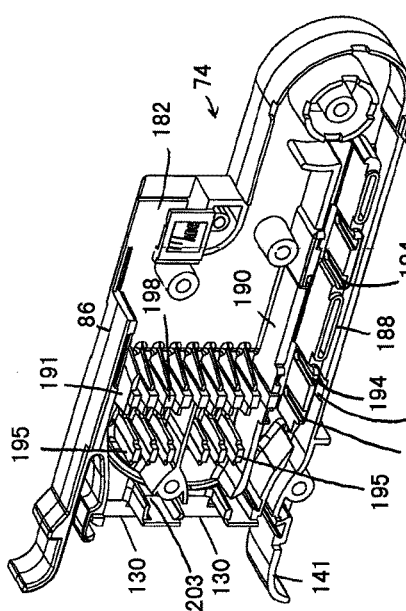
FIG. 34
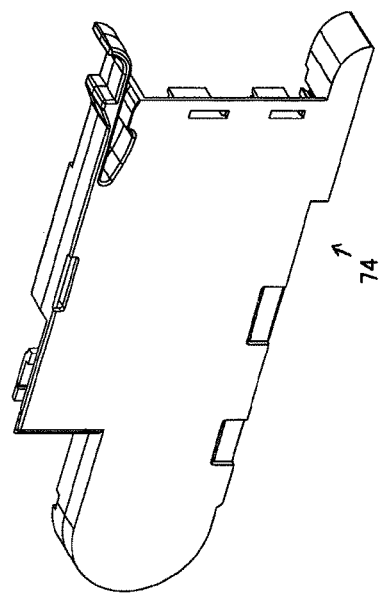
FIG. 33
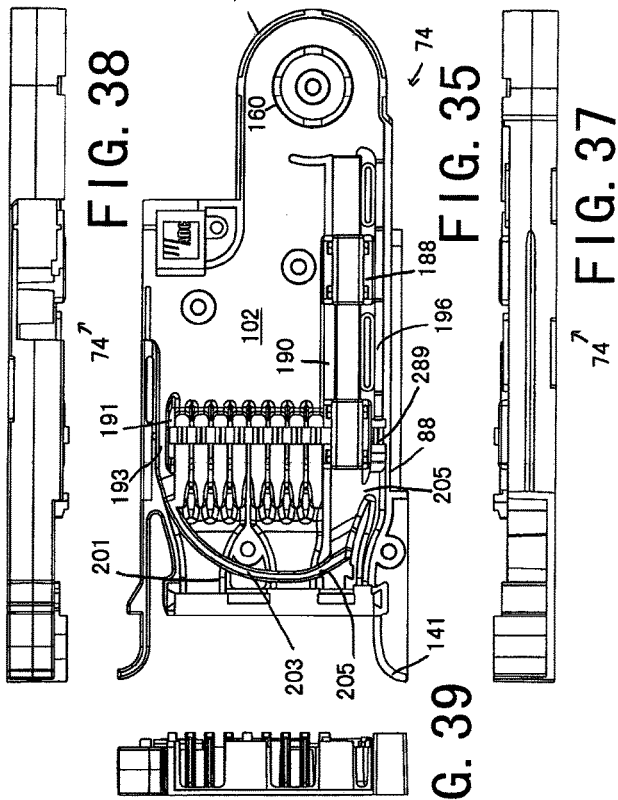
FIG. 38
FIG. 35
FIG. 37
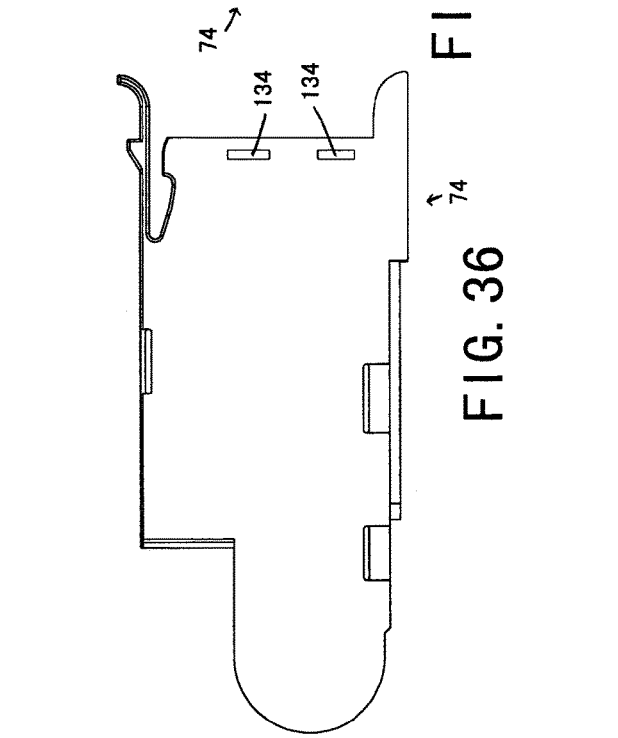
FIG. 39
FIG. 36

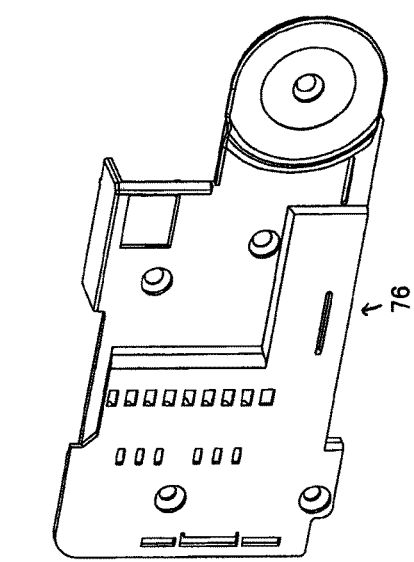
FIG. 41
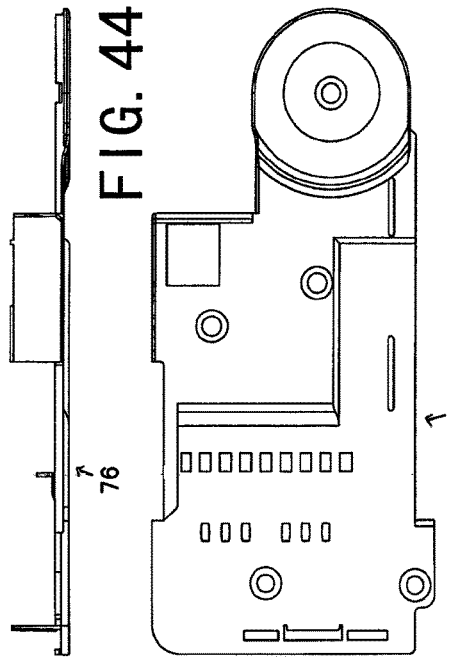
FIG. 44
FIG. 42
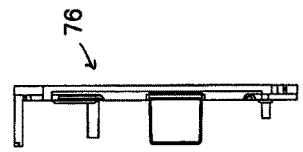
FIG. 45
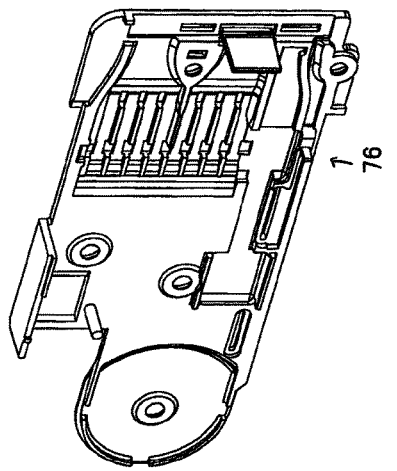
FIG. 40
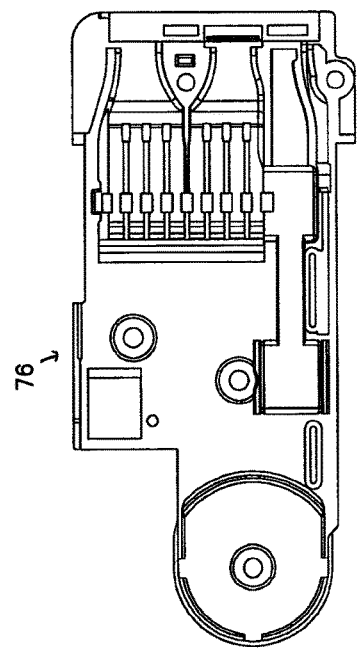
FIG. 43

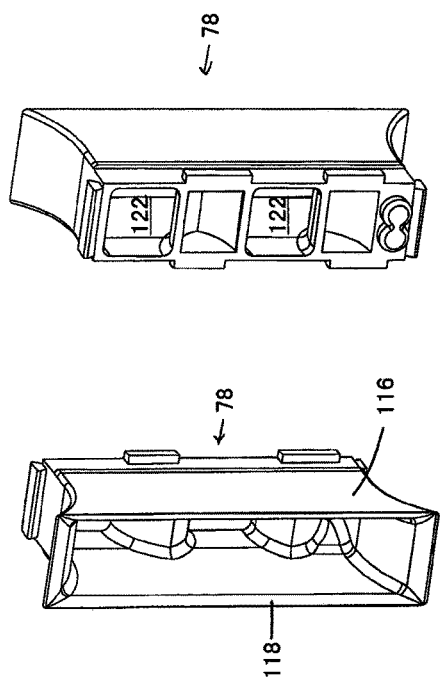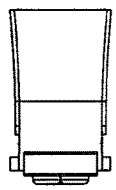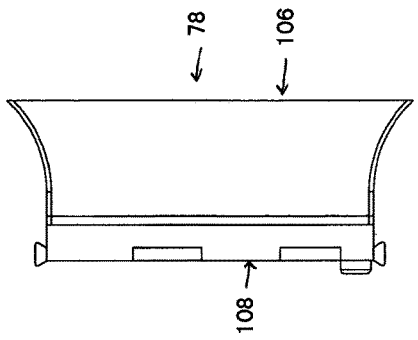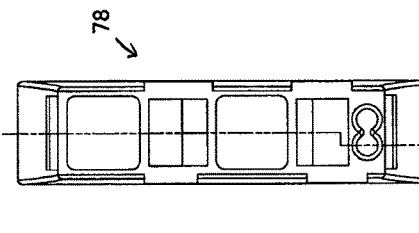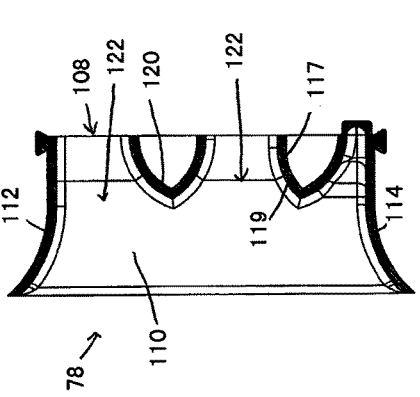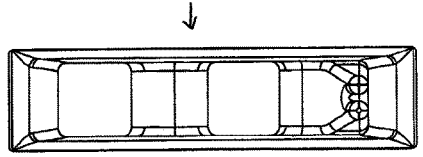

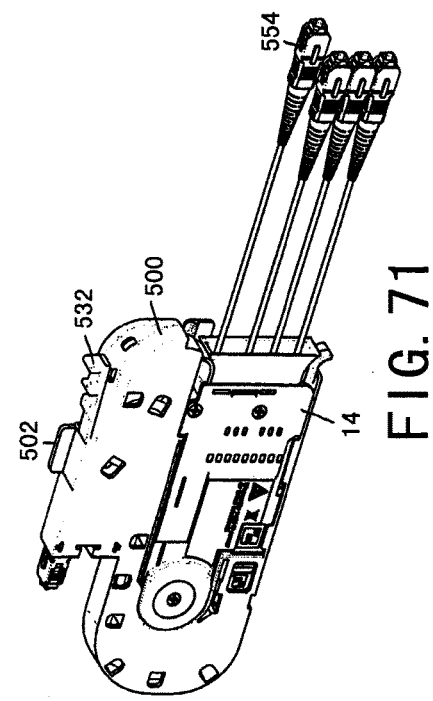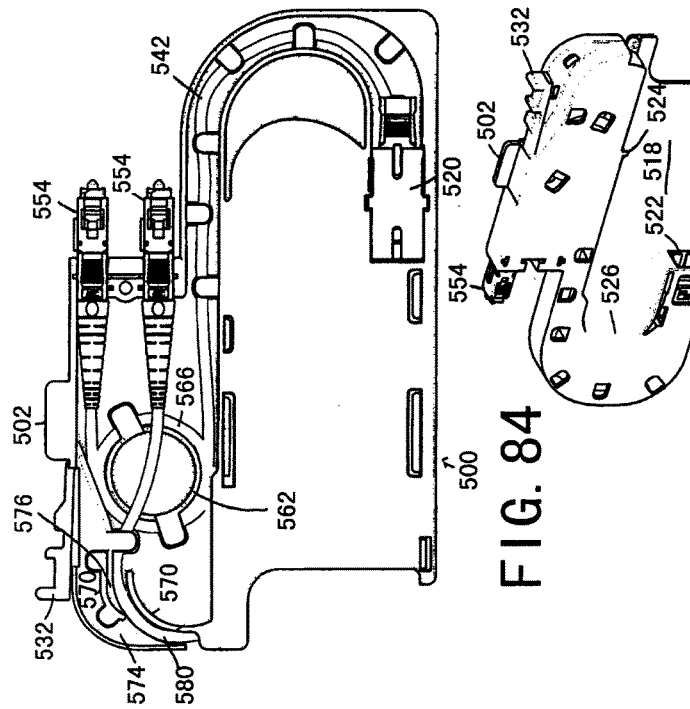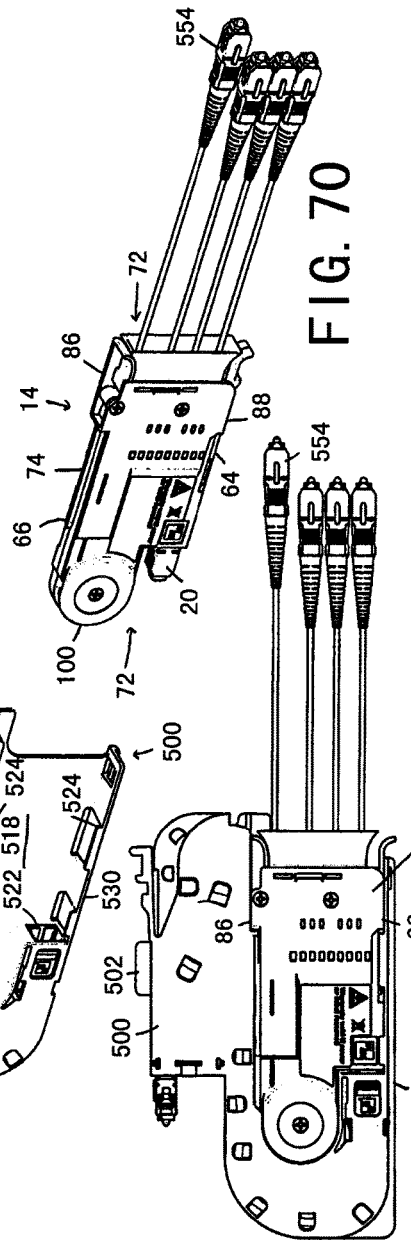

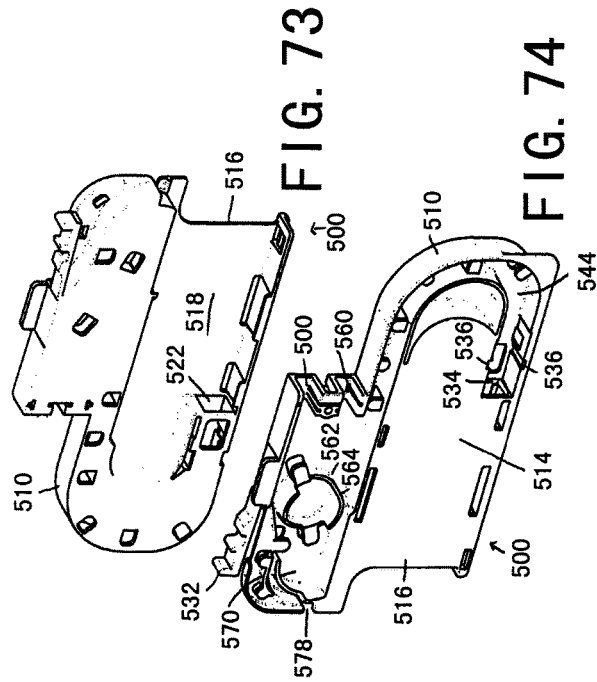
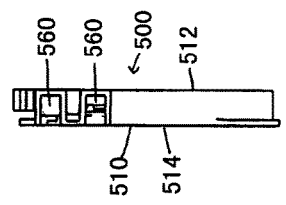
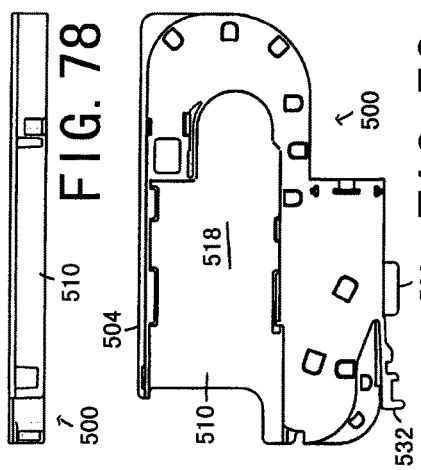
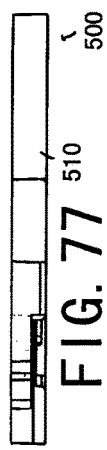
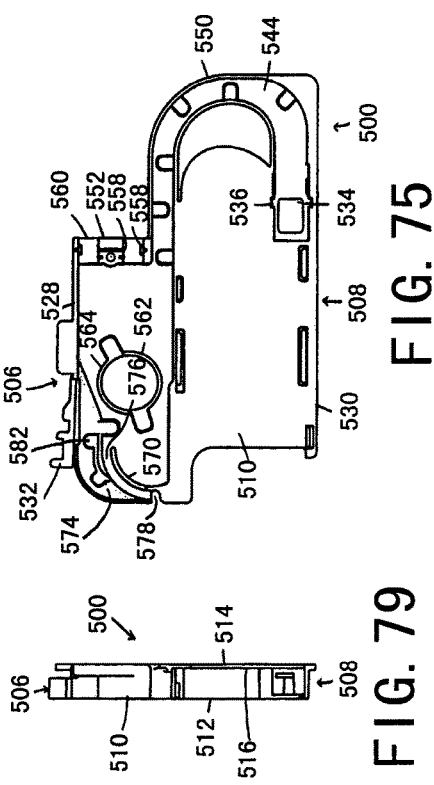

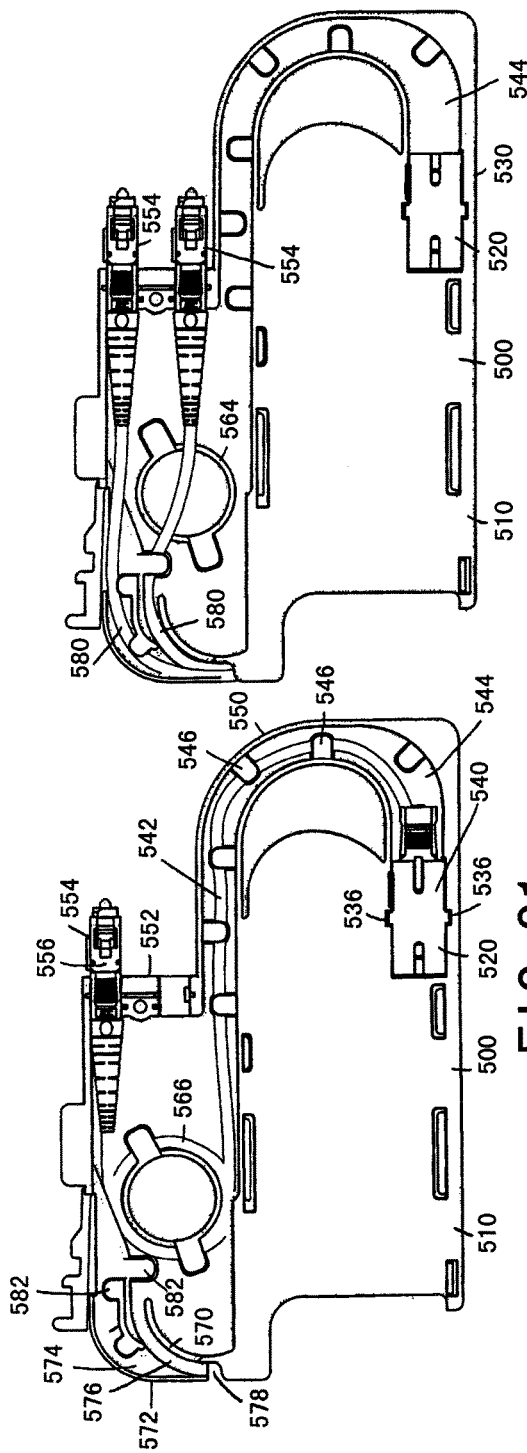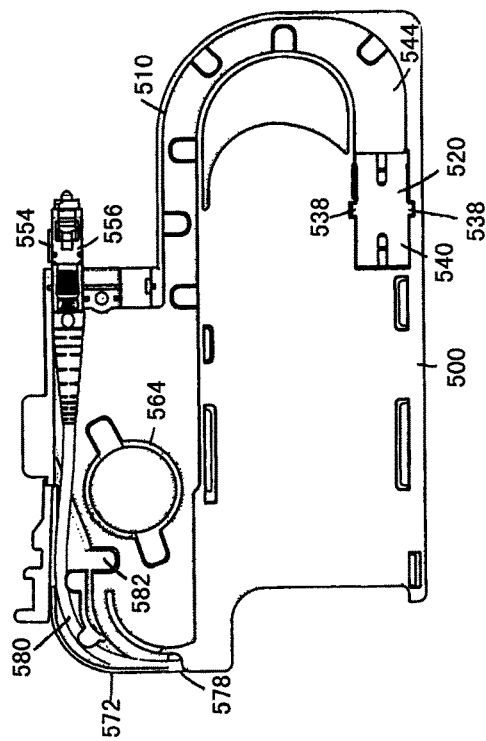
FIG. 81
FIG. 82
FIG. 83

ADAPTER FOR FIBER OPTIC MODULE

CROSS-REFERENCE TO RELATED APPLICATIONS

This application is a continuation of U.S. application Ser. No. 14/343,291, filed 26 Jun. 2014, now U.S. Pat. No. 9,417,401, which is a National Stage Application of PCT/CN2011/079371, filed 6 Sep. 2011, which applications are incorporated herein by reference. To the extent appropriate, a claim of priority is made to each of the above disclosed applications.

FIELD

The present disclosure generally relates to fiber optic telecommunications equipment. More specifically, the present disclosure relates to an adapter for use with a fiber optic module, wherein the fiber optic module is normally configured to be mounted to a first piece of telecommunications equipment without the adapter and wherein the adapter allows the fiber optic module to be mounted to a different second piece of telecommunications equipment.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

The types of chassis for mounting modules may vary depending upon the application, the capacity, and the location thereof. The modules that include the fiber optic equipment are normally specifically designed for a given chassis. What is needed is a system that allows a module that is configured for a first type of chassis to be able to be installed in a second type of chassis without having to modify the external and internal features of the module.

SUMMARY

The present invention relates to an adapter structure for use with a fiber optic module, wherein the fiber optic module is normally configured to be mounted to a first piece of telecommunications equipment without the adapter and wherein the adapter allows the fiber optic module to be mounted to a second piece of telecommunications equipment having a different configuration than the first piece of telecommunications equipment.

According to one aspect of the present disclosure, the adapter slidably and removably mounts on the exterior of the fiber optic module for converting the configuration of the module for installation in a type of telecommunications equipment that is different than the type of telecommunications equipment that the module was configured for without the adapter.

According to another aspect of the present disclosure, an adapter for use with a telecommunications module that is configured to be slidably inserted into a first type of telecommunications chassis comprises a body configured to be mounted to the telecommunications module. The body of the adapter includes structure for mounting the telecommunications module to a second type of telecommunications chassis that is different than the first type of telecommunications chassis, wherein the telecommunications module is not configured to be mounted to the second type of telecommunications chassis without the adapter. The adapter includes at least one fiber optic connector protruding outwardly from the body for receiving a fiber optic signal to be relayed to fiber optic equipment of the telecommunications module.

According to another aspect, a method of mounting a telecommunications module to a second type of telecommunications chassis is disclosed, wherein the telecommunications module is normally configured for mounting to a first telecommunications chassis with a flexible latch and the second telecommunications chassis is different than the first telecommunications chassis such that the flexible latch is not used for mounting to the second telecommunications chassis.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 2 is a right side view of the telecommunications assembly of FIG. 1;

FIG. 3 is a left side view of the telecommunications assembly of FIG. 1;

FIG. 4 is a top view of the telecommunications assembly of FIG. 1;

FIG. 7 is a front perspective view of the chassis configured to house a plurality of the fiber optic modules shown in FIG. 1, the chassis shown with a plurality of adapters mounted therein;

FIG. 8 is a top view of the chassis of FIG. 7;

FIG. 9 is a right side view of the chassis of FIG. 7;

FIG. 10 is a left side view of the chassis of FIG. 7;

FIG. 11 is a front view of the chassis of FIG. 7;

FIG. 12 is a rear view of the chassis of FIG. 7;

FIG. 13 is a front perspective view of another embodiment of a chassis configured to house a plurality of the fiber optic splitter modules having front signal input locations;

FIG. 14 is a top view of the chassis of FIG. 13;

FIG. 15 is a right side view of the chassis of FIG. 13;

FIG. 16 is a left side view of the chassis of FIG. 13;

FIG. 17 is a front view of the chassis of FIG. 13;

FIG. 18 is a rear view of the chassis of FIG. 13;

FIG. 19 is a front perspective view of one of the fiber optic modules of FIG. 1;

FIG. 20 is a rear perspective view of the fiber optic module of FIG. 19;

FIG. 21 is a top view of the fiber optic module of FIG. 19;

FIG. 22 is a bottom view of the fiber optic module of FIG. 19;

FIG. 23 is a right side view of the fiber optic module of FIG. 19, shown without a cover exposing the interior features of the fiber optic module including routing of a fiber optic cable within the fiber optic module;

FIG. 24 is a cross-sectional view taken along section line 24-24 of FIG. 23;

FIG. 26 illustrates a front perspective view of the fiber optic module of FIGS. 19-25, the fiber optic module configured as a front-input module;

FIG. 27 is a rear perspective view of the fiber optic module of FIG. 26;

FIG. 28 is a top view of the fiber optic module of FIG. 26;

FIG. 29 is a bottom view of the fiber optic module of FIG. 26;

FIG. 30 is a right side view of the fiber optic module of FIG. 26, shown without a cover exposing the interior features of the fiber optic module including routing of a fiber optic cable within the fiber optic module;

FIG. 31 is a cross-sectional view taken along section line 31-31 of FIG. 30;

FIG. 33 is a front perspective view of the main housing portion of the fiber optic module of FIGS. 19-32, the main housing portion shown in isolation without the internal components mounted therein;

FIG. 34 is a rear perspective view of the main housing portion of FIG. 33;

FIG. 35 is a right side view of the main housing portion of FIG. 33;

FIG. 36 is a left side view of the main housing portion of FIG. 33;

FIG. 37 is a bottom view of the main housing portion of FIG. 33;

FIG. 38 is a top view of the main housing portion of FIG. 33;

FIG. 39 is a front view of the main housing portion of FIG. 33;

FIG. 40 is a front perspective view of the cover of the fiber optic module of FIGS. 19-32;

FIG. 41 is a rear perspective view of the cover of FIG. 40;

FIG. 42 is a right side view of the cover of FIG. 40;

FIG. 43 is a left side view of the cover of FIG. 40;

FIG. 44 is a top view of the cover of FIG. 40;

FIG. 45 is a front view of the cover of FIG. 40;

FIG. 50 is a front perspective view of the cable exit structure of the fiber optic module of FIGS. 19-32;

FIG. 51 is a rear perspective view of the cable exit structure of FIG. 50;

FIG. 52 is a left side view of the cable exit structure of FIG. 50;

FIG. 53 is a front view of the cable exit structure of FIG. 50;

FIG. 54 is a rear view of the cable exit structure of FIG. 50;

FIG. 55 is a cross-sectional view taken along section line 55-55 of FIG. 54;

FIG. 56 is a top view of the cable exit structure of FIG. 50;

FIG. 70 illustrates a front exploded view of the adapter of the present disclosure with the fiber optic module of FIGS. 1-67;

FIG. 71 illustrates a front perspective view of the adapter of FIG. 70 with the fiber optic module of FIGS. 1-67 mounted therein;

FIG. 72 is a left side view of the adapter and module of FIG. 71;

FIG. 73 is a front perspective view of the adapter of FIGS. 70-72 shown in isolation, the adapter having features that are examples of inventive aspects in accordance with the present disclosure;

FIG. 74 is a rear perspective view of the adapter of FIG. 73;

FIG. 75 is a right side view of the adapter of FIG. 73;

FIG. 76 is a left side view of the adapter of FIG. 73;

FIG. 77 is a top view of the adapter of FIG. 73;

FIG. 78 is a bottom view of the adapter of FIG. 73;

FIG. 79 is a front view of the adapter of FIG. 73;

FIG. 80 is a rear view of the adapter of FIG. 73;

FIG. 81 illustrates a first example cable routing configuration used within the adapter of FIG. 73, wherein the module of FIGS. 1-67 has been configured as a single rear-input module;

FIG. 82 illustrates a second example cable routing configuration used within the adapter of FIG. 73, wherein the module of FIGS. 1-67 has been configured as a single front-input module;

FIG. 83 illustrates a third example cable routing configuration used within the adapter of FIG. 73, wherein the module of FIGS. 1-67 has been configured to include two front signal inputs; and FIG. 84 illustrates a fourth example cable routing configuration used within the adapter of FIG. 73, wherein the module of FIGS. 1-67 has been configured to include one rear signal input and one front signal input.

DETAILED DESCRIPTION

Figure 1:
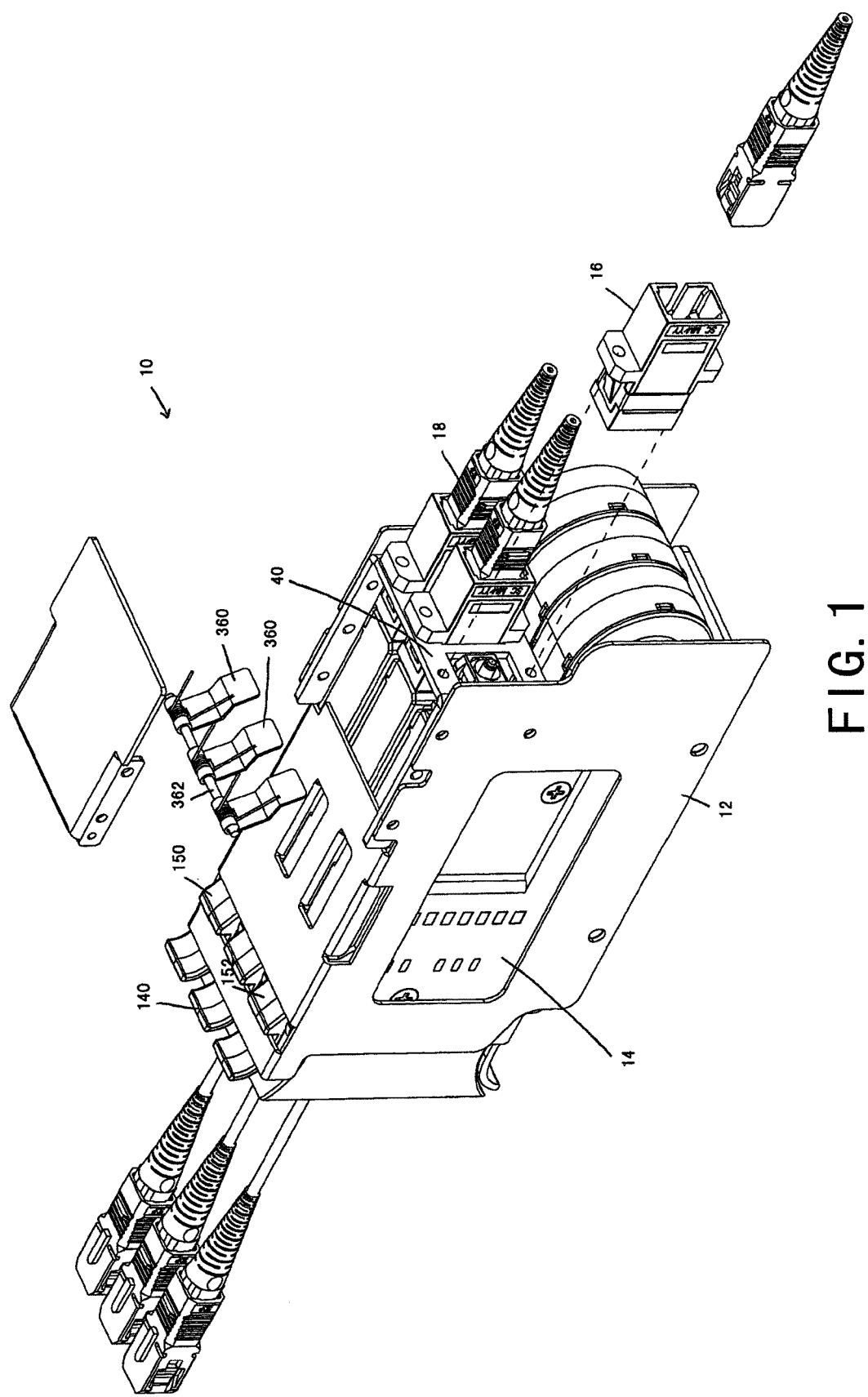
FIG. 1 is a rear perspective view of a telecommunications assembly with a plurality of fiber optic modules installed within a chassis, with one of the adapters and the shield structures exploded out of the telecommunications assembly.
Figure 6:
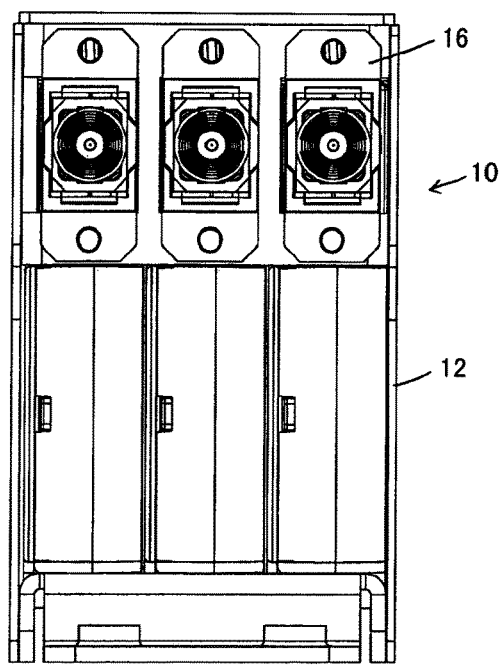
FIG. 6 is a rear view of the telecommunications assembly of FIG. 1.
Figure 5:
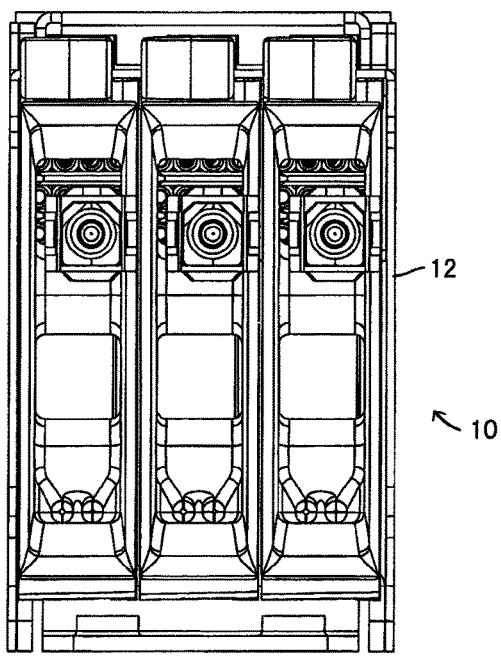
FIG. 5 is a front view of the telecommunications assembly of FIG. 1.

Reference will now be made in detail to exemplary aspects of the present invention which are illustrated in the accompanying drawings. Wherever possible, the same reference numbers will be used throughout the drawings to refer to the same or similar parts.

FIGS. 1-6 illustrate a telecommunications assembly 10 that includes a telecommunications chassis 12 and a plurality of fiber optic modules 14 adapted to be mounted within the chassis 12. The fiber optic modules 14 are configured to be slidably inserted within the chassis 12 through a front opening 34. According to one example embodiment, the fiber optic signal input location is provided by a connector 20 protruding from the rear of the fiber optic modules 14. For each mounting location 52 of the chassis 12, there are positioned corresponding fiber optic adapters 16. Inserting the module 14 through the front opening 34 of the chassis 12 at a mounting location 52 positions the connectors 20 of the modules 14 for insertion into and mating with the adapters 16 of the chassis 12. The adapters 16 form connection locations between the connectors 18 terminated to an incoming fiber optic cable and the connectors 20 of the modules 14 mounted within the chassis 12 (e.g., when the modules are configured as rear-input modules). The adapters 16 are similar to those shown in commonly-owned U.S. Pat. No. 5,317,663, the disclosure of which is incorporated herein by reference in its entirety. As will be discussed below, in other embodiments, the fiber optic signal input location may be provided at the front of the module housing and the chassis may be configured accordingly.

The chassis 12 of the telecommunications assembly 10 includes a top wall 26 and a bottom wall 28 extending between a pair of opposing transverse sidewalls, the right sidewall 30 and the left sidewall 32, a rear wall 40, and the front opening 34. Depending upon the signal input location used on the fiber optic modules 14 as will be discussed in further detail below, the rear wall 40 of the chassis may or may not be configured for mounting adapters 16 for mating with connectors 20 protruding from the modules 14. As shown in FIG. 1, for embodiments of the chassis that are configured to receive rear signal input modules, the chassis 12 includes spring-mounted shields 360 that are biased downwardly. The shields 360 are mounted to the chassis 12 via a pin 362. The shields 360 are located adjacent the rear of the chassis 12 and are positioned in front of the adapters 16. The shields 360 are configured to provide protection against accidental exposure to fiber optic light. Insertion of the splitter module 14 into the chassis 12 pushes the shields 360 out of the way and the connector 20 of the module 14 can be coupled to the adapter 16 mounted at the rear wall 40 of the chassis 12 as shown in FIGS. 63-67.

Although the chassis shown in the present disclosure are depicted as being able to accommodate three fiber optic modules 14, the chassis depicted herein are simply example embodiments, and different sized chassis may be provided as part of the telecommunications assembly 10, depending upon the density of the system. There might be embodiments that hold twelve or even twenty-four fiber optic modules 14.

The chassis 12 shown in FIGS. 1-12 is configured to occupy one standard unit (RU) of rack space within a standard telecommunications rack. In such an embodiment, the chassis 12 may include a height between about 2 and 3 inches. More preferably, the chassis 12 may include a height of about 2.3 inches or about 2.322 inches.

Referring to FIG. 7, the chassis 12 includes a plurality of mounting locations 52 for slidably receiving the modules 14. Referring to FIG. 1, the rear wall 40 of the chassis 12 is configured for mounting adapters 16. As previously noted, for chassis that are configured to receive fiber optic modules 14 that are set-up as front input modules, the rear wall of the chassis does not include fastener-based mounting locations for mounting adapters 16. Such an embodiment of a chassis 212 is shown in FIGS. 13-18.

For all embodiments of the chassis, adjacent the front end 157 of the chassis, the top wall defines a slot 155. The slot 155 is for receiving a latching tab 150 of a flexible latch 140 of a fiber optic module 14. As shown in FIG. 1, the latching tab 150 includes a ramped face 152 that causes the flexible latch 140 to elastically deflect downwardly when a module 14 is being inserted into chassis 12. The latching tab 150 also includes a square face 154 that is configured to act as a stop within the slot 155 for keeping the module 14 snap-fit within the chassis 12. The removal of the module 14 from the chassis 12 is performed by pressing the latch 140 downwardly to clear the square face 154 of tab 150 from the slot 155 and sliding module 14 away from the chassis 12.

FIGS. 19-25 illustrate one of the fiber optic modules 14 of the assembly. The module 14 shown in FIGS. 19-25 is configured as a rear-input module having a signal-input location 68 that is located adjacent the rear 70 of the module 14 for inputting a fiber optic signal into the module 14. As previously noted and as will be described in further detail, the module can be configured as a front-input module that has signal-input locations adjacent the front 72 of the module. FIGS. 26-32 illustrate the module configured as a front-input module. When a module 14 is used in a front-input configuration, an aperture 182 at the rear wall 90 of the module 14 that is normally used to receive a fiber optic connector 20 may be covered by an insert piece 244. It should be noted that the fiber optic module 14, whether it is configured as a rear-input module or a front-input module, utilizes generally the same module components such as the main housing portion 74, the cover 76, the cable exit structure 78, and the fiber retainer 80.

Figure 25:
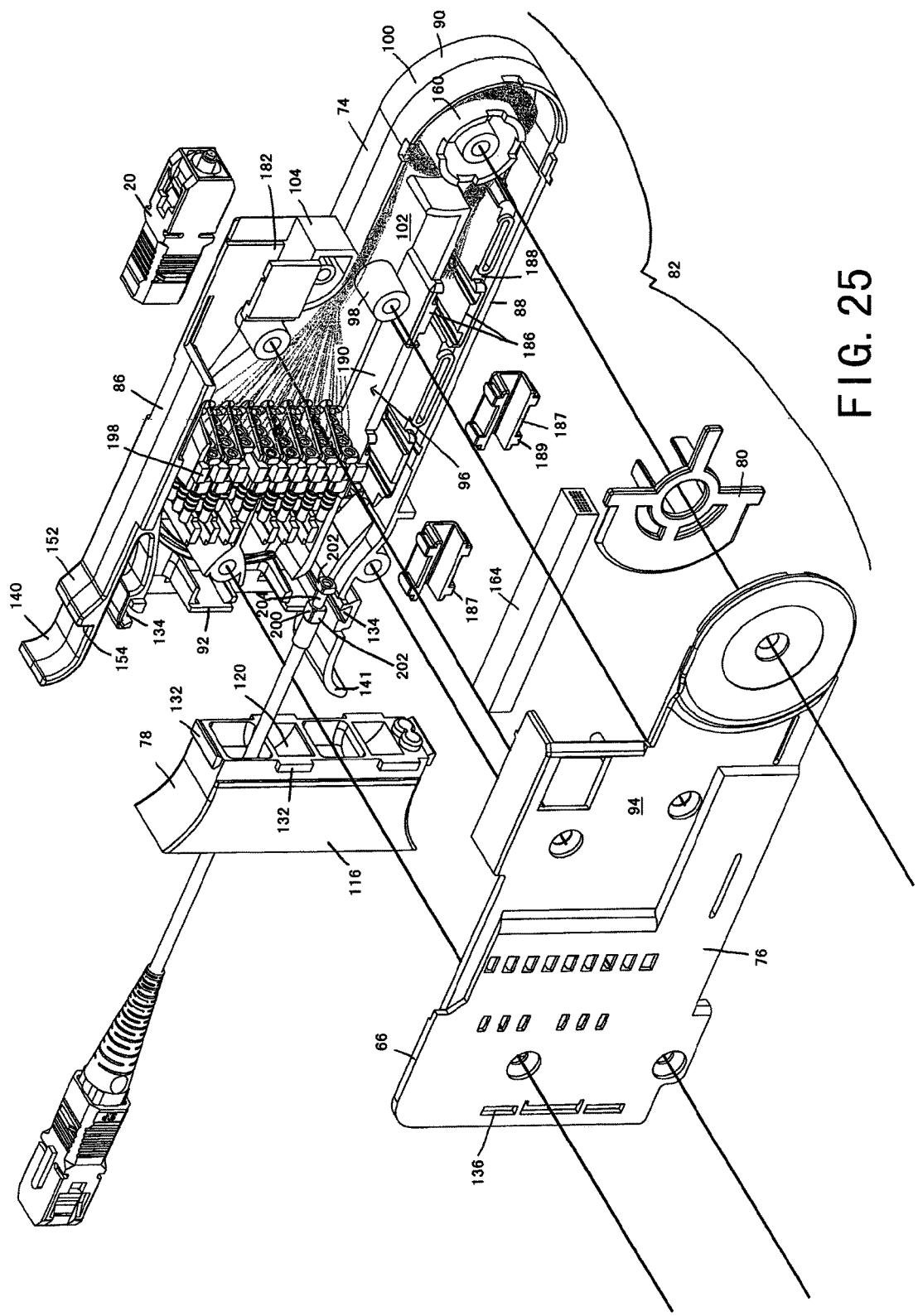
FIG. 25 is an exploded view of the fiber optic module of FIG. 19.

Referring now to FIG. 25, the fiber optic module 14 includes a module housing 82. The module housing 82 includes the main housing portion 74 (shown in isolation in FIGS. 33-39) and the removable cover 76 (shown in isolation in FIGS. 40-45). The main housing portion 74 includes a first transverse sidewall 84 (i.e., a left sidewall) extending between a top wall 86, a bottom wall 88, a rear wall 90, and a front wall 92. Removable cover 76 defines a second transverse wall 94 (i.e., a right sidewall) of the module housing 82 and closes off the open side 96 of the module main housing 74.

The cover 76 is mounted to the main housing portion 74 by fasteners. through fastener mounts 98 defined on main housing portion 74 (see FIG. 25). The bottom wall 88 of the main housing portion 74 defines a bottom mounting flange 64 and the top end of the cover 76 defines a top mounting flange 66 for sliding the module 14 into the chassis 12. The bottom wall 88 and the bottom flange 64 define a channel 65 that provides a keying system with the chassis 12 for correctly orienting the fiber optic modules 14 during insertion.

A height HM of the module 14 is defined between the top wall 86 and the bottom wall 88. The height HM of the module 14 is preferably configured for mounting the module 14 within a chassis occupying one standard unit (RU) of rack space within a standard telecommunications rack. In such an embodiment, the module 14 may include a height HM of between about 2 and 3 inches. More preferably, the module 14 may include a height HM of about 2.166 inches.

The rear wall 90 of main housing portion 74 includes a curved portion 100 configured to provide bend radius protection to cables within the interior 102 of the main housing 74. The rear wall 90 of the main housing 74 also includes an inset portion 104. As shown, a fiber optic connector 20 positioned at the inset portion 104 protrudes rearwardly from the rear wall 90 for mating with a fiber optic adapter 16 mounted adjacent the rear 40 of the chassis 12.

Figure 32:
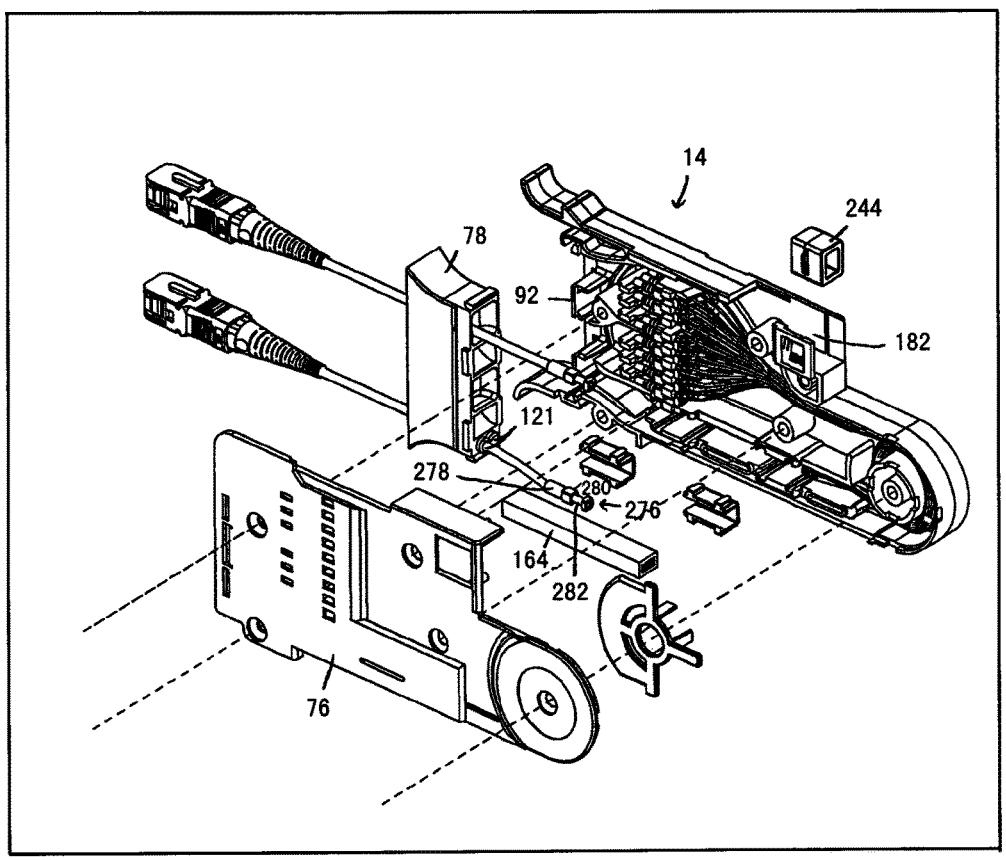
FIG. 32 is an exploded view of the fiber optic module of FIG. 26.
Figure 47:
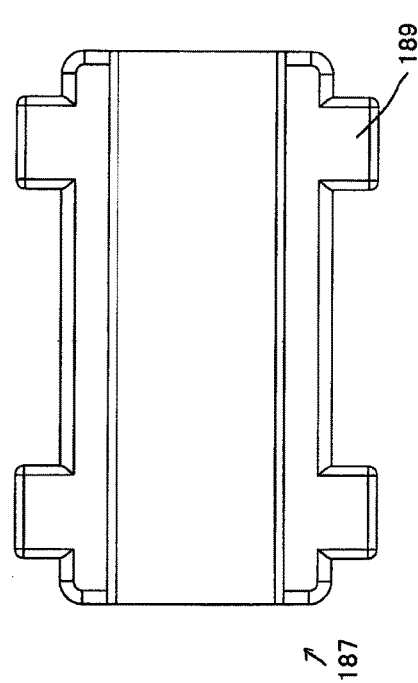
FIG. 47 is a right side view of the friction clamp of FIG. 46.
Figure 48:
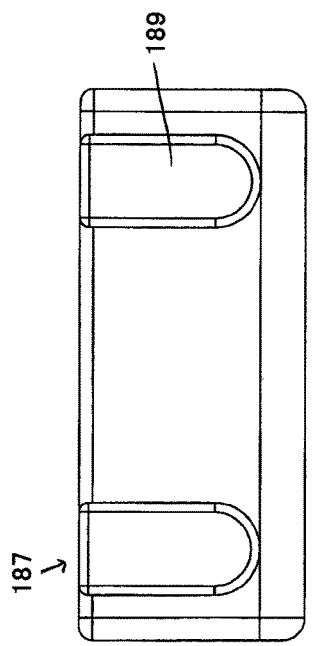
FIG. 48 is a bottom view of the friction clamp of FIG. 46.
Figure 46:
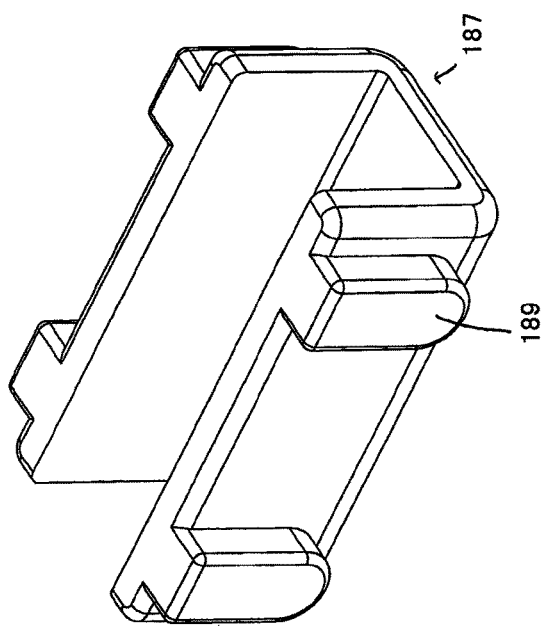
FIG. 46 is a rear perspective view of a friction clamp configured for use with the fiber optic module of FIGS. 19-32.
Figure 49:
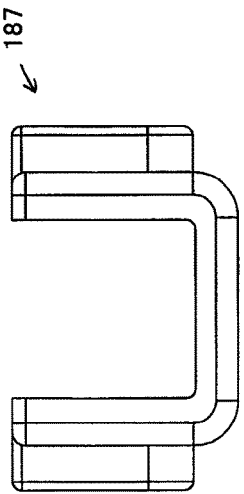
FIG. 49 is a front view of the friction clamp of FIG. 46.
Figure 62:
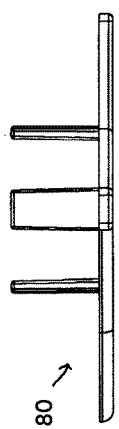
FIG. 62 is a top view of the fiber retainer of FIG. 57.
Figure 59:
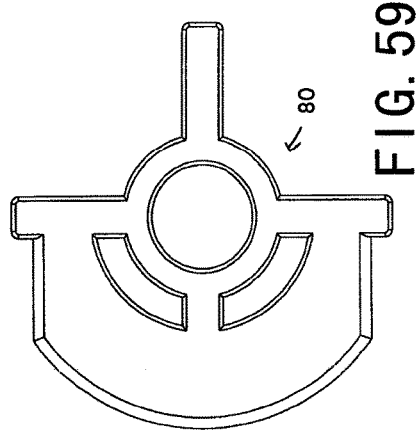
FIG. 59 is a right side view of the fiber retainer of FIG. 57.
Figure 58:
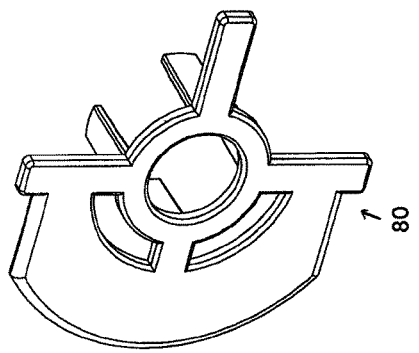
FIG. 58 is a rear perspective view of the fiber retainer of FIG. 57.
Figure 61:
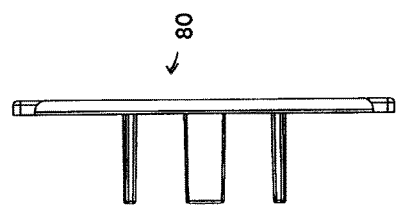
FIG. 61 is a front view of the fiber retainer of FIG. 57.
Figure 57:
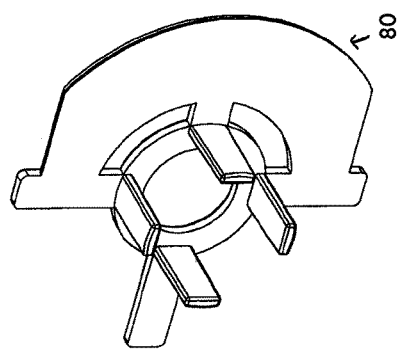
FIG. 57 is a front perspective view of a fiber retainer configured to be coupled to the main housing portion of the fiber optic module as shown in FIG. 25.
Figure 60:
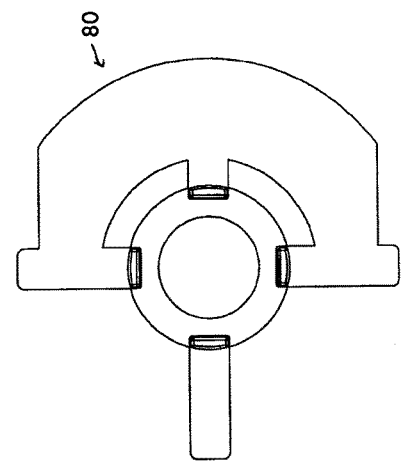
FIG. 60 is a left side view of the fiber retainer of FIG. 57.

Each module 14 includes a cable exit structure 78 extending from the front wall 92 of module main housing 74. The cable exit structure 78 is shown in detail in FIGS. 50-56. The cable exit structure 78 defines a front end 106 and a back end 108 and an opening 110 extending therebetween. The cable exit structure 78 defines a top wall 112, a bottom wall 114, a right sidewall 116 and a left sidewall 118. A first partition 120 adjacent the back end 108 of the cable exit structure 78 divides the opening 110 into two distinct channels 122 at the rear end 108. A bulkhead 119 at the back end 108, adjacent the bottom wall 114, can be used as a second partition 117 when the module 14 is used as a front-input module. As shown in FIG. 32, two openings 121 are punched out from the cable exit structure 78 for insertion of input cables into the main housing portion 74. When the two openings 121 are punched out, the bulkhead 119 provides a second partition 117 at the back end 108 of the cable exit structure 78 and divides the main opening into three distinct channels 122. The partitions 117, 120 may include curved surfaces for guiding cables downwardly and/or upwardly while providing bend radius protection.

As shown in FIG. 25, the cable exit structure 78 is slidably mounted to main housing 74 and captured by the cover 76. The cable exit structure 78 defines protruding lips 132 that are slidably inserted into recesses 134 defined around the front apertures/channels 130 of the main housing 74. The cover 76 also includes slits 136 that receive protruding lips 132 defined at the right sidewall 116 of the cable exit structure 78. As shown in FIGS. 21 and 22, the cable exit structure 78 is preferably sized thin enough to fit within the profile of the fiber optic module 14 to preserve the density of the telecommunications assembly 10.

Still referring to FIG. 25, the main housing 74 (shown in isolation in FIGS. 33-39) of the module 14 includes an integrally formed flexible latch 140 (i.e., cantilever arm) that is adapted to engage a portion of the chassis 12 to hold module 14 within the chassis 12. Flexible latch 140 also deflects to permit withdrawal of the module 14 from the chassis 12. Opposite the flexible latch 140, the main housing portion 74 also includes a fixed handle 141 defined by the bottom wall 88. A user can grasp the handle 141 and the latch 140 at the same time for pulling or pushing purposes. Within interior 102 of main housing 74, the module 14 includes a first radius limiter 160 (e.g., a spool) adjacent the curved portion 100 of the rear wall 90 of the main housing 74. A fiber retainer 80 (shown in detail in FIGS. 57-62) may be placed on the main housing portion 74 to keep cables wrapped around the first radius limiter 160. The fiber retainer 80 includes a generally circular shape to match the contour of the curved portion 100 of the rear wall 90 of the main housing 74.

A connector 20 of the module 14 projects out from rear wall 90 at the inset portion 104 of the rear wall 90. The connector 20 of the module 14 is slidably inserted into a connector aperture 182 defined at the rear wall 90 of the main housing 74. Once slidably inserted, the connector 20 is captured within the housing 82 by the cover 76.

Adjacent the bottom wall 88 of the main housing 74 within the interior 102 is placed an optical component 164 such as a fiber optic splitter or a fan-out. It should be noted that although the modules 14 of the present disclosure are depicted and described as being splitter modules, other types of telecommunications equipment such as combiners, attenuators, equalizers, multiplexers/demultiplexers, etc. may be provided in the modules 14.

The optical component 164 is held within the interior 102 of the main housing 74 by a clamp structure 186. The clamp structure 186 includes a pair of friction clamps 187 (e.g., a rubber gasket) that are inserted between an upper clamp wall 190 and a lower clamp wall 188. The upper and the lower clamp walls 190, 188 define notches 194 for slidably receiving tabs 189 of the friction clamps 187. The friction clamps 187 are made from materials having a high coefficient of friction to frictionally hold the optical component 164 within the clamp structure 186. One of the friction clamps 187 is shown in isolation in detail in FIGS. 46-49.

It should be noted that different optical components may have different thicknesses and may require the use of different sized clamp structures including the clamp walls and the friction clamps for holding the optical component in place. The bottom clamp wall 188 is positioned to leave a space 196 between the bottom wall 88 of the main housing 74 and the bottom clamp wall 188 for accommodating fiber optic cables that are routed within the module 14 (see FIGS. 23 and 30). When the module 14 is used as a front input module, input cables are also routed through the space 196, as will be discussed in further detail below.

Still referring to FIG. 25, the module main housing 74 also includes integrally formed crimp holders 198 (e.g., slots) extending in a stacked arrangement generally from the top wall 86 to the top clamp wall 190 of the module main housing 74. Crimp elements 200 crimped to ends of cables that are split by the optical component 164 are slidably received into the crimp holders 198. Each crimp element 200 defines square flanges 202 between which is defined a recessed portion 204. The crimp holders 198 include complementary structure to the crimp elements 200 such that once the crimp elements 200 are slidably inserted into the crimp holders 198, the crimp elements 200 are prevented from moving in a longitudinal direction. Once slidably inserted, crimp elements 200 are held in place by the cover 76 that is mounted to the splitter module main housing 74. In the embodiment shown, there are eight crimp holding slots 198, each one being able to accommodate up to four crimp elements 200 for a total output capacity of thirty-two cables. As such, a 1:32 fiber optic splitter may be housed within the module 14. Other numbers are possible.

The topmost crimp holder defines a wall 191 adjacent the top wall 86 of the main housing 75 (see FIGS. 34, 35). The wall 191 is positioned to leave a space 193 for guiding fiber optic cables during routing of the cables within the module 14.

The main housing portion 74 also includes cable management structures 195 located between the crimp holders 198 and the front wall 92 of the main housing 74. The cable management structures 195 are defined as protrusions that extend from the left transverse sidewall 84 of the main housing 74 toward the cover 76. The protrusions defining the cable management structures 195 define channels that align with the slots created by the crimp holders 198 for guiding cables out of the module 14. The protrusions define eight channels for the eight crimp holding slots 198.

Adjacent the front wall 92 of the main housing 74, the module 14 includes a bulkhead 201 that separates the front wall 92 of the main housing 74 into two exit channels 130. In addition to guiding cables to the cable exit structure 78, the bulkhead 201 also defines a slot 203 for allowing cables to be routed in a direction from the top wall 86 toward the bottom wall 88 of the module. The top clamp wall 190 and the bottom clamp wall 188 also define slots 205 for allowing cables to be routed into the space 196 formed adjacent the bottom wall 88 of the main housing 74.

FIG. 23 shows the fiber optic splitter module 14 without the cover 76 exposing the interior features of fiber optic splitter module 14 including a sample routing of a fiber optic cable within the fiber optic splitter module 14, when the module is used as a rear input module. In the example embodiment shown and described, the optical component 164 is a fiber optic splitter that splits the signal of a single strand to a plurality of secondary signals. In another embodiment, the first cable may be a multi-strand fiber cable with a plurality of strands of optical fiber and the optical component may be a fanout to separate the individual strands into each of a plurality of second cables.

If a splitter is utilized, the splitter may be a 1×32 splitter. Other splitter configurations such as a 1×16 or 2×16, etc., could be used in other embodiments.

An outside cable may extend to rear end of an adapter 16 within the chassis 12 and be terminated by a connector 18 that is optically connected to the connector 20 of the module 14 through the adapter 16 once module is inserted within chassis 12. Once the first cable 270 is split, second cables 272 extend from optical component 164 and are looped around first radius limiter 160 before being directed toward the crimp holders 198. From the crimp holders 198, cables 274 crimped to the other ends of the crimps 200 exit the module 14 through the module exit structure 78.

It should be noted that the routing of the fiber optic cables within module 14 as shown in FIG. 23 is only one example and other ways of routing the cables within the module 14 are possible.

It should be noted that although the connectors 18, 20 and the adapters 16 depicted herein are of the SC type, other types, formats, styles, and sizes of telecommunications connectors and adapters may be used.

As discussed above, the module 14 can be configured as a front-input module that has signal-input locations/connections 276 adjacent the front wall 92 of the module main housing 74. Referring to FIGS. 26-32, the module 14 is shown configured as a front-input module that may have two front signal-input locations 276 in a stacked arrangement extending from the left sidewall 84 to the right sidewall 94 defined by the cover 76. As described previously, two openings 121 may be punched out from the cable exit structure 78 for insertion of input cables into the main housing portion 74. The number of openings 121 used may be based on the type of splitter (1×32, 1×16, 2×16, etc.) or other optical elements provided in the module housing 82.

As shown in FIG. 32, each input connection 276 includes a boot 278 that mates with a crimp element 280. The crimp element 280 defines a circumferential notch 282 (i.e., recessed portion). The circumferential notch 282 is slidably inserted into a crimp holding structure 289 defined between the bottom wall 88 of the main housing portion 74 and the bottom clamp wall 188. The crimp elements 280 of the input connections 276 are captured by the cover 76 when the cover 76 is mounted on the module main housing 74.

As discussed previously, when the module 14 is used as a front-input module, the aperture 182 that is normally used to receive the fiber optic connector 20 for inputting the input signal may be covered by an insert piece 244 (see FIG. 32).

FIG. 30 shows the fiber optic splitter module 14 without the cover 76 exposing the interior features of fiber optic splitter module 14 when the module is configured as a front-input module. FIG. 30 also illustrates a sample routing of a fiber optic cable within fiber optic splitter module 14.

As shown in FIG. 30, a first cable 270 extends from the front input connection 276 toward the rear end of the module 14, passing underneath the clamp structure 186 through the space 196 defined between the bottom wall 88 of the main housing 74 and the clamp structure 186 toward the first radius limiter 160. After going around the radius limiter 160, the cable 270 is directed toward the front of the module 14. The cable is routed through the slot 203 defined by the bulkhead 201 and directed into the optical component 164. Once the first cable 270 is split, second cables 272 extend from the optical component 164 and are looped around first radius limiter 160 before heading toward the crimp holders 198. From the crimp holders 198, cables 274 crimped to the other ends of the crimps 200 exit the module 14 through the module exit structure 78.

Fiber optic modules that are similar to the modules 14 described herein are shown and described in commonly-owned U.S. Pat. Nos. 7,376,322; 7,400,813; 7,376,323; and 7,346,254, the entire disclosures of which are incorporated herein by reference.

Figure 65:
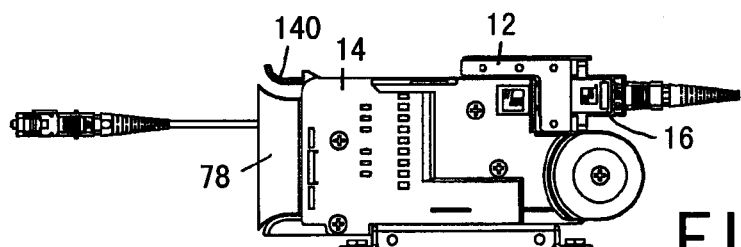
FIG. 65 illustrates the fiber optic module of FIG. 63, shown in a fully inserted position within the chassis.
Figure 64:
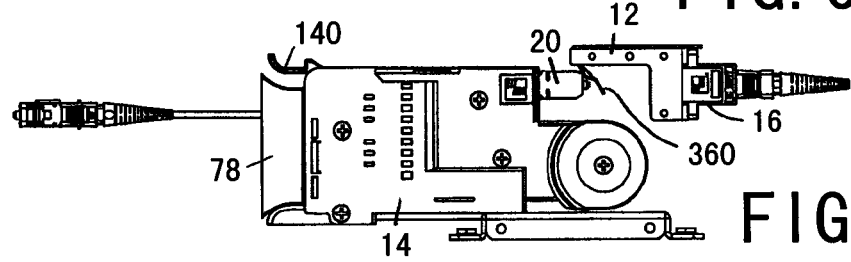
FIG. 64 illustrates the fiber optic module of FIG. 63, shown in a position within the chassis with the connector of the fiber optic module making initial contact with the shield.
Figure 63:
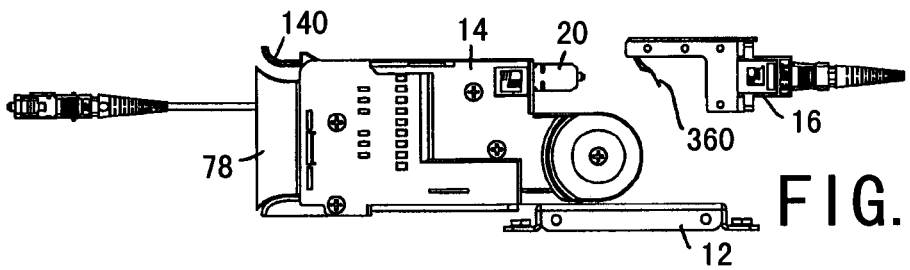
FIG. 63 illustrates a fiber optic module partially inserted within the chassis of FIG. 1, the chassis including an adapter mounted thereon, the fiber optic module shown in a position prior to the connector of the module having contacted a shield located within the chassis.

The insertion of a module 14 into the chassis 12 of the telecommunications assembly 10 is illustrated in FIGS. 63-67. FIG. 63 illustrates the fiber optic module 14 partially inserted, wherein the module 14 is shown in a position prior to the connector 20 of the module 14 having contacted the spring biased shield 360 located within the chassis 12. FIG. 64 illustrates the module 14 in a position with the connector 20 making initial contact with the shield 360. FIG. 65 illustrates the module 14 in a fully inserted position within the chassis 12.

Figure 67:
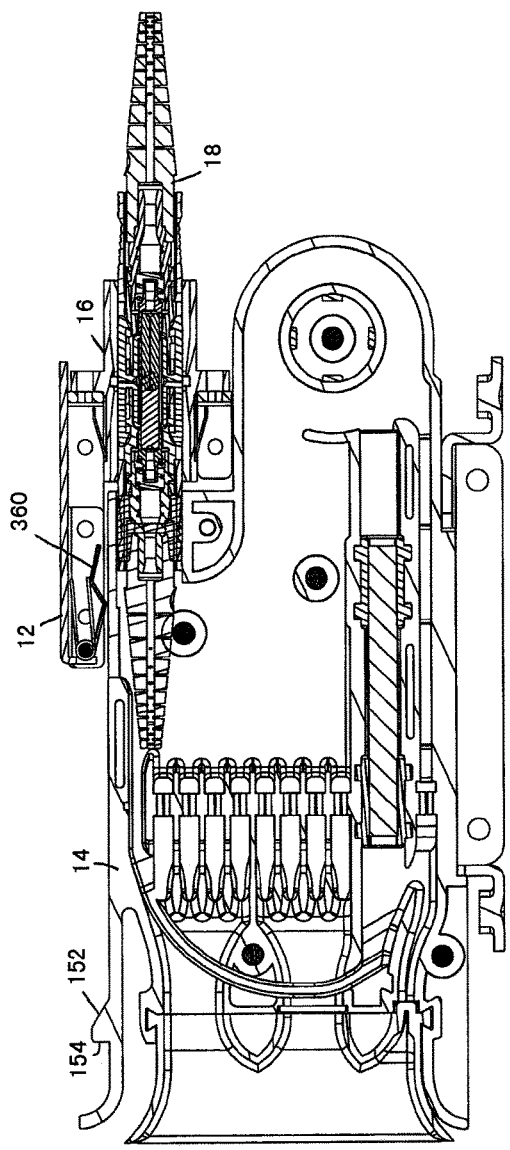
FIG. 67 is a side cross-sectional view of the fiber optic module of FIG. 65 within the chassis, taken through the center of the fiber optic module.
Figure 66:
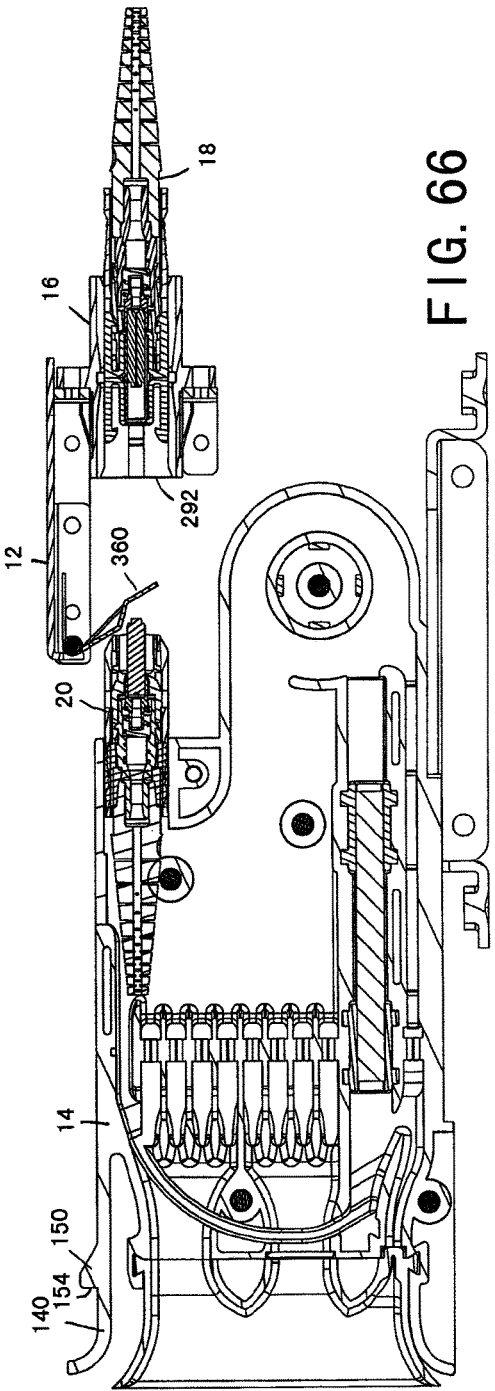
FIG. 66 is a side cross-sectional view of the fiber optic module of FIG. 64 within the chassis, taken through the center of the fiber optic module.

FIG. 66 is a side cross-sectional view of the fiber optic module 14 within the chassis 12, taken through the center of the fiber optic module 14, wherein the module 14 is in a position within the chassis 12 with the connector 20 making initial contact with the shield. FIG. 67 is a side cross-sectional view of the module 14 within the chassis 12, taken through the center of the module 14, wherein the module 14 is in a fully inserted position within the chassis 12.

As the shield 360 is fully deflected, further insertion of the module 14 brings the connector 20 of the module 14 into contact with the adapter 16 and the connector 20 is received within the front end 292 of the adapter 16. The flexible latch 140 is deflected downwardly as the module 14 is inserted and then flexes back upwardly so that the latching tab 150 of the main housing 74 is captured within the slot 155 for keeping the module 14 snap-fit within the chassis 12. The module 14 is now in position to process and transmit signals through first cable 270, optical component 164 and second cable 272 within the module interior. The removal of the module 14 from the chassis 12 is performed by pressing the latch 140 downwardly to clear the square face 154 of the latching tab 150 from the slot 155 and sliding the module 14 away from the chassis 12.

Figure 68:
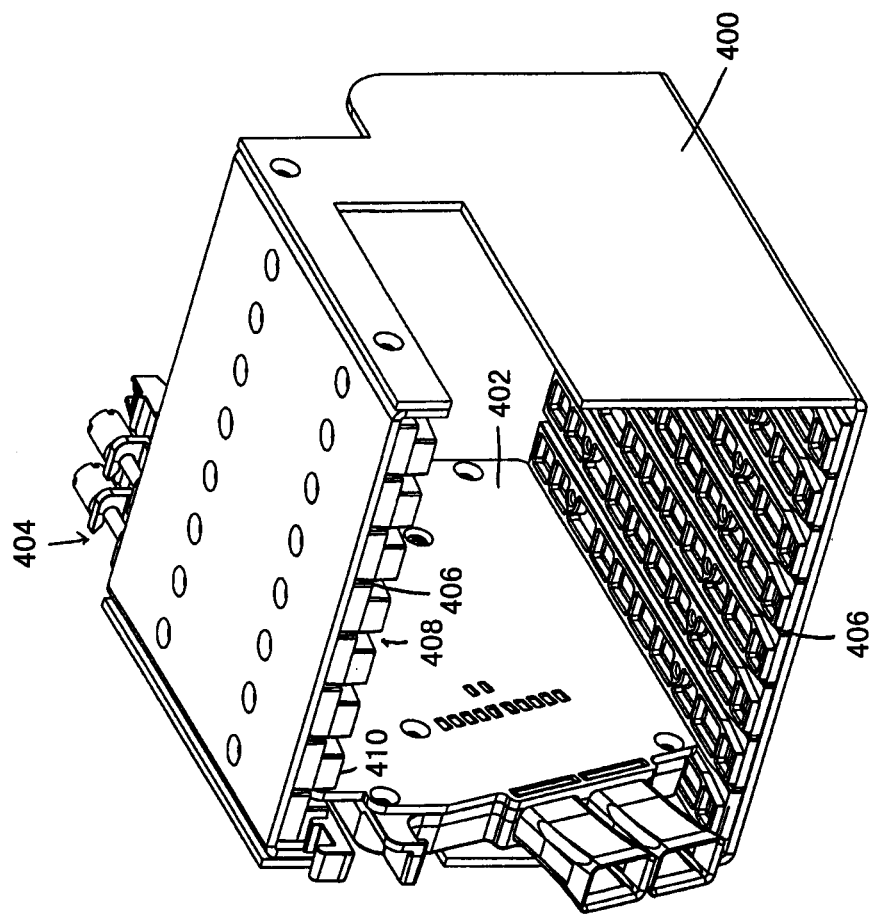
FIG. 68 is a front perspective view of an example prior art chassis shown with a prior art fiber optic module and two prior art adapter assemblies mounted therein, wherein the adapter of the present disclosure shown in FIGS. 70-84 allows the fiber optic module shown in FIGS. 1-67 of the present application to be mounted to a chassis of the type shown in FIG. 68.
Figure 69:
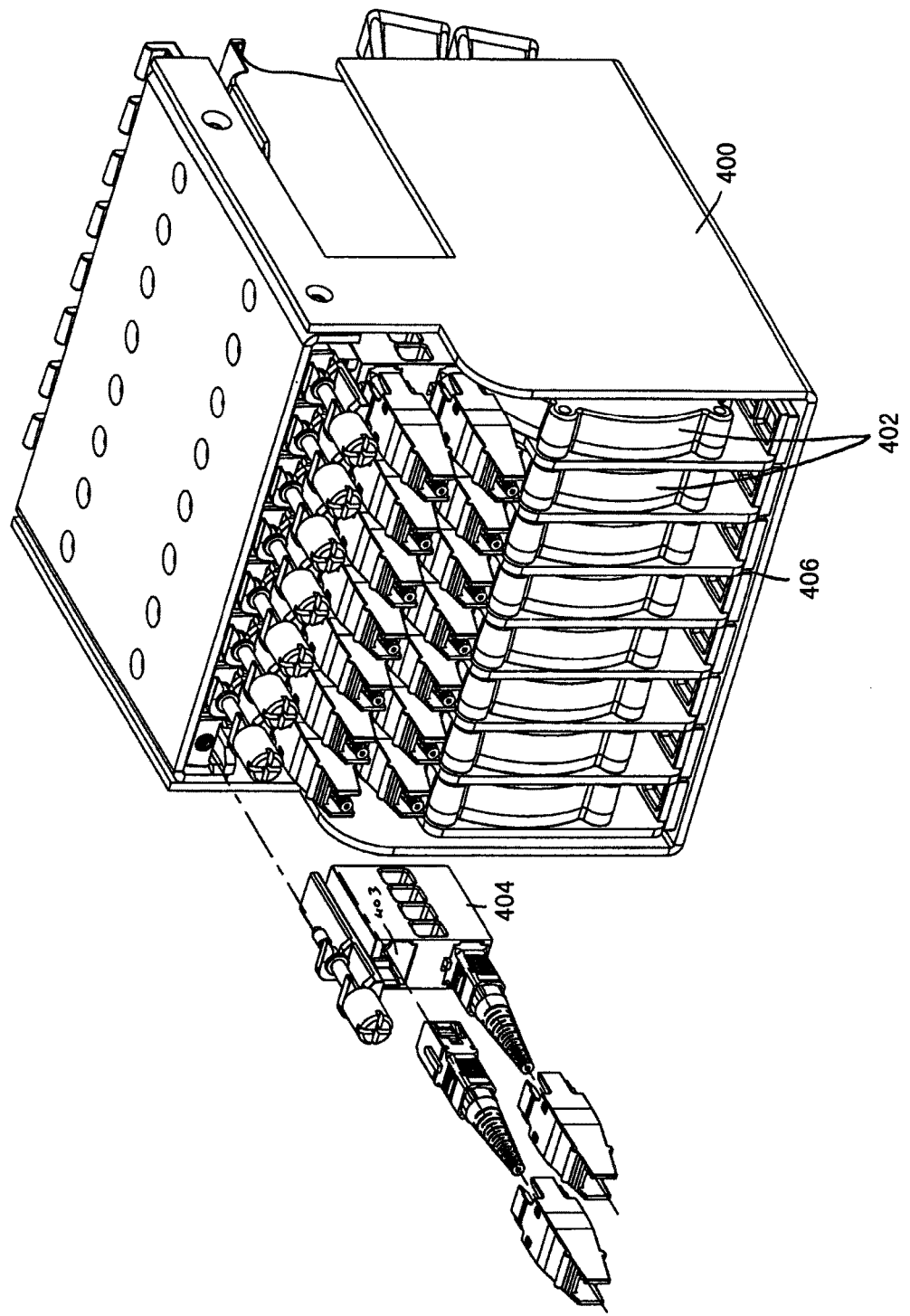
FIG. 69 is a rear perspective view of the prior art chassis shown in FIG. 68, the prior art chassis shown with a plurality of the prior art fiber optic modules and a plurality of the prior art adapter assemblies mounted therein, wherein the adapter of the present disclosure shown in FIGS. 70-84 allows the fiber optic module shown in FIGS. 1-67 of the present application to be mounted to a chassis of the type shown in FIGS. 68 and 69.

The fiber optic module 14 shown in FIGS. 1-67 is specifically configured to fit into types of chassis such as chassis 12 of FIGS. 1-12 or chassis 212 of FIGS. 13-18. FIGS. 70-84, however, illustrate an adapter structure 500 that is configured to allow the fiber optic module 14 to be mounted to a type of chassis (an example of which is shown in FIGS. 68 and 69) that is different than the type of chassis such as chassis 12 and chassis 212. The adapter 500 is configured to be slidably and removably mounted on the exterior of the fiber optic module 14. The adapter 500 converts the configuration of the module 14 for installation in a type of telecommunications equipment that is different than the type of telecommunications equipment that the module 14 was initially designed for without the adapter 500 (e.g., the chassis 12 or 212 of FIGS. 1-18).

Now referring to FIGS. 68 and 69, an example prior art chassis 400 is shown with prior art fiber optic modules 402 and prior art adapter assemblies 404 mounted therein. The adapter 500 of the present disclosure shown in FIGS. 70-84 allows the fiber optic module 14 shown in FIGS. 1-67 of the present application to be mounted to a chassis of the type shown in FIGS. 68 and 69. The adapter structure 500 is configured such that it has similar exterior dimensions and features to that of one of the prior art fiber optic modules 402. Once receiving the fiber optic module 14 therein, the adapter structure 500 is inserted into a chassis such as chassis 400 in a similar fashion to those of prior art fiber optic modules 402.

As will be discussed in further detail below, the chassis 400 of FIGS. 68 and 69 includes opposing slots 406 at mounting locations 408 which are configured to slidably receive mounting flanges 502, 504 located on the top and bottom ends 506, 508 of the adapter structure 500. The chassis 400 of FIGS. 68 and 69 also defines a front lip 410 that is configured to engage a flexible latch 532 of the adapter 500 to interlock the adapter 500, and thus, the module 14, to the chassis 400. A chassis similar to chassis 400 of FIGS. 68 and 69 and the process of mounting a fiber optic module thereinto, is shown and described in greater detail in U.S. Pat. No. 7,418,181, the entire disclosure of which is incorporated herein by reference.

With the use of the adapter structure 500 having features that are examples of inventive aspects in accordance with the present disclosure, the module 14, which is not normally designed for the type of chassis 400 shown in FIGS. 68-69, can nevertheless be mounted within the chassis 400.

The adapter 500 that allows the module 14 to be converted between a module that is designed to be mounted to a first type of chassis (e.g., the chassis 12 or 212 of FIGS. 1-18) and a module that can be mounted into a second different type of a chassis (e.g., the chassis 400 of FIGS. 68-69 similar to the chassis shown in U.S. Pat. No. 7,418,181) is shown in detail in FIGS. 70-84.

In FIGS. 70-72, the adapter structure 500 is shown in combination with the splitter module 14, wherein the installation of the module 14 into the adapter 500 is illustrated.

In FIGS. 73-80, the adapter 500 is shown in isolation.

FIGS. 81-84 illustrate the different cable routing configurations that may be used within the adapter 500 of FIGS. 73-80 when mounting the fiber optic module 14 therein, depending upon whether the module 14 is configured as a front, rear, or combination signal input module and/or a single or dual input module.

As will be described below, the module 14 may have a signal input at the rear of the module, wherein that signal is relayed from a connector protruding from the adapter structure. The module 14 may have a signal input at the front of the module, through the cable exit structure 78 of the module 14. That input signal may come directly into the module through structure 78 or may be relayed from a connector that protrudes from the adapter structure 500 to the structure 78. The module 14 may also have input signals at both the front of the module and the rear of the module, wherein the signal at the front of the module enters through the structure 78 of the module and the signal at the rear is relayed from a connector protruding from the adapter structure 500. Whenever both the connectors of the adapter structure 500 are used to input a signal into the module 14 (such as shown in FIG. 84), one input is directed to the front of the module through the cable exit structure 78 and one input is directed to the rear of the module through a patch cable.

Now referring to FIGS. 70-80, the adapter structure 500 includes a body 510 defining a first transverse side 512 and a second transverse side 514, the first and second sides 512, 514 separated by a wall 516. The first side 512 (i.e., the left side) of the body 510 defines a cradle 518 for slidably receiving the module housing 82 of the fiber optic module 14. As shown in FIGS. 70-71, when the module 14 is inserted into the cradle 518, the connector 20 of module 14 that protrudes out from the module housing 82 is inserted into a fiber optic adapter 520 located on the adapter structure 500. As shown in FIGS. 70, 71, and 81-84, one end of the fiber optic adapter 520 is accessible through an aperture 522 located on the first side 512 of the body 510. The first side 512 of the body 510 also defines opposing stop structures 524 for contacting the top and bottom walls 86, 88 of the module main housing portion 74 for preventing further insertion of the module 14 into the adapter body 510. The cradle 518 defines a curved rear end 526 for matching the contour of the curved portion 100 of the rear wall 90 of the main housing 74 of the module 14.

The adapter body 510 includes a top wall 528 and a bottom wall 530. As noted previously, a top mounting flange 502 extends from the top wall 528 and a bottom mounting flange 504 extends from the bottom wall 530. The top and bottom mounting flanges 502, 504 replace the mounting flanges 64, 66 of the module 14 as the structures that are to be used for mounting the module 14 to a piece of telecommunications equipment. As noted previously, a type of chassis such as chassis 400 shown in FIGS. 68 and 69 includes opposing top and bottom slots 406 at mounting locations 408. The adapter 500 is sized and configured such that the top and bottom mounting flanges 502, 504 thereof slide into the top and bottom slots 406 of the chassis 400. With the use of the adapter structure 500, the upper and lower flanges 502, 504 replace the upper and lower flanges 66, 64 of the module 14 as the main guides that are used to guide the module 14 into a piece of telecommunications equipment. As shown in FIGS. 71 and 72, the cradle 518 of the adapter 500 is sized and configured so as to accommodate the upper and lower flanges 66, 64 of the module 14 when slidably mounting the module 14 to the adapter 500.

A portion of the top wall 528 of the adapter body 510 defines an integrally formed flexible latch 532 (i.e., cantilever arm). The flexible latch 532 extends forwardly and is adapted to engage a portion of the chassis 400 to hold adapter 500, and thus, the module 14, within the chassis 400. As noted above, the chassis 400 of FIGS. 68 and 69 defines a front lip 410 that is configured to engage the flexible latch 532 of the adapter 500 to interlock the adapter 500, and thus, the module 14, to the chassis 400. The flexible latch 532 is configured to deflect to permit withdrawal of the adapter structure 500 from the chassis 400. Since the adapter 500 is configured to have a similar exterior dimension and include similar features to those of prior art fiber optic modules 402, mounting and removal of the adapter 500 is similar to that of the prior art fiber optic modules 402, which are described in detail in U.S. Pat. No. 7,418,181, the entire disclosure of which has been incorporated herein by reference.

Now referring to FIGS. 74, 75, and 81-84, the second side 514 (i.e., right side) of the adapter body 510 is illustrated. As shown in these FIGS., the second side 514 defines a fiber optic adapter mount 534 adjacent the bottom wall 530 of the adapter body 510. The fiber optic adapter mount 534 includes opposing notches 536 for receiving flanges 538 of the housing 540 of the fiber optic adapter 520. The fiber optic adapter 520 depicted in the Figures is a conventional SC type fiber optic adapter, described in further detail in, for example, U.S. Pat. No. 5,317,663, the entire disclosure of which has been incorporated herein by reference. As noted above, one end of the fiber optic adapter 520 is positioned adjacent the aperture 522 for engaging the connector 20 protruding from the module 14.

As will be described in further detail below, once the protruding connector 20 is inserted into the fiber optic adapter 500, a patch cord 542 with two connectorized ends can be used to relay a signal from outside the adapter structure 500 to the connector 20 engaged to the fiber optic adapter 520.

As shown in FIGS. 74, 75, 81-84, a curved cable path 544 (preserving fiber bend radius requirements) is defined on the second side 514 of the body 510. The cable path 544 includes cable management fingers 546 and is configured to direct a cable from the fiber optic adapter 520, around the curved path 544, toward the upper, front end of the adapter body 510.

As shown in FIGS. 74, 75, and 81-84, a rear wall 550 of the adapter body 510 defines an inset portion 552. The inset portion 552 is configured to receive a pair of fiber optic connectors 554 that protrude rearwardly from the adapter body 510. The body 510 is configured such that connector housings 556 can slidably be inserted into opposing slots 558 formed in apertures 560 adjacent the rear wall 550. The fiber optic connectors 554 protruding from the rear wall 550 of the adapter body 510 are configured similar to those of prior art modules 402 shown in FIGS. 68 and 69 and are configured to engage adapter assemblies 404 that might be mounted on the rear ends of the chassis such as chassis 400, as shown in FIGS. 68 and 69. As described in U.S. Pat. No. 7,418,181, the connectors 554 located at the rear wall 550 of the adapter body 510 may be used to input signals into the module 14 through the adapter assemblies 404.

It should be noted that, as discussed above, one of the connectors 554 that are slidably inserted into the inset portion 552 of the adapter body 510 may be the connectorized end of a patch cord 542 that is used to relay a signal to the connector 20 of the module 14 through the fiber optic adapter 520 located within the adapter body 510. In this manner, if the module 14 is used as a rear input module, through the patch cord 542, the signal incoming through the adapter assemblies 404 of a chassis such as chassis 400 is input into the connector 20 protruding from the module 14.

As shown in FIGS. 82 and 83, one or more of the fiber optic connectors 554 that are slidably inserted into the inset portion 552 of the adapter body 510 may also be used to relay one or more input signals to the front 72 of the module 14 if the module is used at least partially as a front input module. In that case, as discussed above, one or more of the openings 121 of the structure 78 are punched for using the module 14 as a front input module.

Still referring to FIGS. 74, 75, and 81-84, the right side 514 of the adapter body 510 defines cable management structures 562 for managing cables from the rear connectors 554 of the adapter structure 500 to input locations of the module 14. For example, as shown in FIGS. 81 and 84, a cable spool 564 is defined for wrapping any slack cable 566 when the rear connector 554 of the module 14 is used for inputting signals to be processed. As shown in FIG. 81, when the module 14 is used a rear input module, wherein a single input is utilized, the patch cord 542 connectorized at both ends may be wrapped around the cable spool 564. Similarly, as shown in FIG. 84, when one of the input signals is through the front 72 of the module 14 and the other input is at the rear 70 of the module 14, the connectorized patch cord 542 is used for the rear input and is wrapped around the cable spool 564 in extending from the inset portion 552 of the adapter body 510 to the fiber optic adapter 520 adjacent the bottom wall 530.

As shown in FIGS. 81 and 84, in the depicted example cable routing configurations, if the rear input of the module 14 is utilized (whether the module is used as a single rear-input module or a combination front/rear input module), normally the upper fiber optic adapter slot is utilized, with the slack cable 566 being wrapped around the cable spool 564.

Now referring to FIGS. 82-84, the adapter body 510 also defines a pair of walls 570 or bulkheads adjacent a front wall 572 of the body 510 that define first and second cable exit paths 574, 576. Both the first and second cable paths 574, 576 lead to an opening 578 at the front wall 572 of the body 510 at the second side 514 of the body 510. The opening 578 is used to lead cables 580 to the front 72 of the module 14 when the module 14 is at least partially used as a front signal input module.

Each of the first and second cable paths 574, 576 include cable management fingers 582 and are curved to preserve fiber bending radius protection. As shown in FIG. 82, if the module 14 is used as a single front input module, the first upper cable path 574 is utilized to relay the input signal from a connector 554 located at the inset portion 552 through the opening 578 at the front wall 572 of the adapter body 510 to the front 72 of the module 14. As shown in FIG. 83, if the module 14 is used a dual front-input module, the adapter 520 mounted within the body 510 is not utilized and both of the first and second cable exit paths 574, 576 are utilized to relay input signals from connectors 554 located at the inset portion 552 through the opening 578 at the front wall 572 of the adapter body 510 to the front 72 of the module 14. As shown in FIG. 84, if the module 14 is used as a combination front/rear input module, wherein one input signal is directed to the front 72 of the module 14 and the other input signal is directed to the rear connector 20 of the module 14, both the lower second cable path 576 (which relays the signal to the front 72 of the module 14 through the opening 578 at the front wall 572 of the adapter body 510) and a connectorized patch cord 542 (which relays the signal to the rear connector 20 of the module 14 through the fiber optic adapter 520) are used.

Thus, with the use of an adapter structure 500 as shown in FIGS. 70-84, a telecommunications module such as the module 14 of FIGS. 1-67, which is configured for installation in a first type of chassis 12 or 212, is able to be installed in a second type of chassis 400 without having to modify the external and internal features of the module 14. And, as described above, the adapter allows the module 14 to be used as a front input module, a rear input module, or a combination front/rear input module depending upon the desired connectivity, wherein the adapter assemblies 404 of chassis such as chassis 400 can be used for inputting signals into the rear 70, the front 72, or both the rear and the front of a module such as module 14. As described, when the module 14 is needed to be used as rear input module, a patch cord 542 connectorized on both ends can be routed through the adapter body 510 for establishing connection between the rear connector 20 of the module 14 and one of the adapters 403 of the adapter assembly 404 of the chassis 400.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application. For example, even though the fiber optic module housing 82 is described as including a "top wall 86" and a "bottom wall 88", the top and bottom walls might be oriented in a horizontal plane when mounting the fiber optic module 14 into a chassis. Such terms are used for ease of description and no restriction is intended by such use of the terms.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. An adapter structure for use with a fiber optic module that is configured to be slidably inserted into a first type of telecommunications chassis, the adapter structure comprising:
   a body configured to be mounted to the fiber optic module, wherein the body of the adapter structure is configured for mounting the fiber optic module to a second type of telecommunications chassis that is different than the first type of telecommunications chassis, wherein the fiber optic module is not configured to be mounted to the second type of telecommunications chassis without the use of the adapter structure, the adapter structure including at least one fiber optic connector protruding outwardly from the body, the at least one fiber optic connector configured to be optically connected to fiber optic equipment of the fiber optic module through a first fiber optic cable, wherein the body of the adapter structure also includes a fiber optic adapter for receiving a second fiber optic connector protruding outwardly from the fiber optic module when the body is mounted on the fiber optic module, wherein the second fiber optic connector of the fiber optic module is optically connected to the fiber optic equipment of the fiber optic module, wherein the fiber optic adapter is configured such that, when the body is mounted on the fiber optic module, the at least one fiber optic connector protruding outwardly from the body is optically connected with the second fiber optic connector through the fiber optic adapter, wherein the at least one connector protruding outwardly from the body defines a terminated end of the first fiber optic cable, and an opposing end of the first fiber optic cable defines a third fiber optic connector that engages the fiber optic adapter located on the body of the adapter structure and that is configured to be connected to the second fiber optic connector of the fiber optic module through the fiber optic adapter for establishing an optical connection between the at least one fiber optic connector protruding outwardly from the body and the fiber optic equipment of the fiber optic module when the body is mounted on the fiber optic module.

2. An adapter structure according to claim 1, wherein the at least one fiber optic connector includes two fiber optic connectors protruding outwardly from the body.

3. An adapter structure according to claim 1, wherein the body defines a top wall, a bottom wall, a front wall, and a rear wall, the rear wall defining an inset portion that is positioned forward of the rear-most portion of the rear wall, the at least one fiber optic connector positioned at the inset portion.

4. An adapter structure according to claim 1, wherein the body of the adapter structure is removably mounted to the telecommunications module.

5. An adapter structure according to claim 1, wherein the body of the adapter structure is slidably mounted to the telecommunications module.

6. An adapter structure according to claim 1, wherein the fiber optic module includes a first flexible latch for interlocking with the first type of telecommunications chassis, wherein the adapter structure includes a second flexible latch for interlocking with the second type of telecommunications chassis, the first flexible latch not configured to be used with the second type of telecommunications chassis once the body is mounted to the fiber optic module.

7. An adapter structure according to claim 1, wherein the fiber optic module includes first upper and lower flanges for slidable insertion into opposing mounting slots of the first type of telecommunications chassis, wherein the adapter structure includes second upper and lower flanges for slidable insertion into opposing mounting slots of the second type of telecommunications chassis, wherein the first upper and lower flanges of the fiber optic module are not configured to fit the mounting slots of the second type of telecommunications chassis.

8. An adapter structure according to claim 1, wherein the fiber optic module is mounted to the adapter structure and the fiber optic module includes a fiber optic splitter that splits an input signal into a plurality of the same output signals.

9. An adapter structure according to claim 1, further comprising a cable management structure for managing the first fiber optic cable from the at least one fiber optic connector protruding outwardly from the body to the fiber optic module.

10. An adapter structure according to claim 1, wherein the body of the adapter structure defines at least one opening for guiding the first fiber optic cable to the fiber optic module.

11. An adapter structure according to claim 10, wherein the opening is defined at a front wall of the body of the adapter structure for guiding the first fiber optic cable to a front end of the fiber optic module.

12. An adapter structure according to claim 10, wherein the at least one opening includes a first opening defined at a front wall of the body for guiding the first fiber optic cable to a front end of the fiber optic module and a second opening for guiding the first fiber optic cable to a rear end of the fiber optic module.

13. An adapter structure according to claim 1, wherein the fiber optic module is mounted to the adapter structure and the at least one fiber optic connector of the adapter structure is optically connected to the fiber optic equipment of the fiber optic module through the first fiber optic cable.

14. A telecommunications assembly comprising:
an adapter structure for use with a fiber optic module, the adapter structure comprising a body configured to be mounted to the fiber optic module, wherein the body of the adapter structure is configured for mounting the fiber optic module to a first telecommunications chassis, wherein the fiber optic module is not configured to be mounted to the first telecommunications chassis without the use of the adapter structure, the adapter structure including at least one fiber optic connector protruding outwardly from the body, the at least one fiber optic connector configured to be optically connected to fiber optic equipment of the fiber optic module through a first fiber optic cable; and
a fiber optic module mounted to the body of the adapter structure, wherein the at least one fiber optic connector of the adapter structure is optically connected to the fiber optic equipment of the fiber optic module through the first fiber optic cable, wherein one of the ends of the first fiber optic cable includes the at least one fiber optic connector that protrudes outwardly from the body of the adapter structure and an opposing end of the first fiber optic cable is optically connected to the fiber optic equipment of the fiber optic module, wherein the opposite end of the first fiber optic cable includes another fiber optic connector optically connected to the fiber optic module through a fiber optic adapter located on the body of the adapter structure, wherein the fiber optic module includes a fiber optic connector that engages the fiber optic adapter when the fiber optic module is mounted to the body.

15. A telecommunications assembly according to claim 14, further comprising a cable management structure for managing the first fiber optic cable from the at least one fiber optic connector protruding outwardly from the body to the fiber optic module.

16. A method of mounting a fiber optic module to a telecommunications chassis, the method comprising:
removably mounting an adapter structure to the fiber optic module, wherein the fiber optic module is not configured to be mounted to the telecommunications chassis without the use of the adapter structure, the adapter structure including at least one fiber optic connector protruding outwardly from the body, the at least one fiber optic connector configured to be optically connected to fiber optic equipment of the fiber optic module through a first fiber optic cable; and
mounting the adapter structure to the telecommunications chassis, wherein the fiber optic module includes a second fiber optic connector that engages a fiber optic adapter of the adapter structure when the adapter structure is mounted to the fiber optic module, the at least one fiber optic connector that protrudes outwardly from the body of the adapter structure being optically connected to the second fiber optic connector of the fiber optic module when the fiber optic adapter of the adapter structure is engaged by the second fiber optic connector of the fiber optic module, wherein the at least one connector protruding outwardly from the body defines a terminated end of the first fiber optic cable, and an opposing end of the first fiber optic cable defines a third fiber optic connector that engages the fiber optic adapter located on the body of the adapter structure and that becomes connected to the second fiber optic connector of the fiber optic module through the fiber optic adapter for establishing an optical connection between the at least one fiber optic connector protruding outwardly from the body and the fiber optic equipment of the fiber optic module when the body is mounted on the fiber optic module.

* * * * *